United States Patent
Hansen et al.

(10) Patent No.: US 12,201,490 B2
(45) Date of Patent: Jan. 21, 2025

(54) DIGITAL DESIGN OF DENTAL MATRIX WITH IMPROVED CUSTOMIZED INTERPROXIMAL CONTACTS

(71) Applicant: Solventum Intellectual Properties Company, Maplewood, MN (US)

(72) Inventors: James D. Hansen, White Bear Lake, MN (US); Katelyn M. Languell, Eagan, MN (US); Joseph C. Dingeldein, Hudson, WI (US); John A. Norris, Woodbury, MN (US)

(73) Assignee: SOLVENTUM INTELLECTUAL PROPERTIES COMPAY, Maplewood, MN (US)

( * ) Notice: Subject to any disclaimer, the term of this patent is extended or adjusted under 35 U.S.C. 154(b) by 0 days.

(21) Appl. No.: 18/686,549

(22) PCT Filed: Aug. 16, 2022

(86) PCT No.: PCT/IB2022/057673
§ 371 (c)(1),
(2) Date: Feb. 26, 2024

(87) PCT Pub. No.: WO2023/031716
PCT Pub. Date: Mar. 9, 2023

(65) Prior Publication Data
US 2024/0325127 A1 Oct. 3, 2024

Related U.S. Application Data

(60) Provisional application No. 63/260,717, filed on Aug. 30, 2021.

(51) Int. Cl.
*A61C 13/00* (2006.01)
*A61C 7/00* (2006.01)
(Continued)

(52) U.S. Cl.
CPC .......... *A61C 13/0019* (2013.01); *A61C 7/002* (2013.01); *A61C 7/08* (2013.01); *A61C 9/0053* (2013.01)

(58) Field of Classification Search
CPC ....... A61C 13/0019; A61C 7/002; A61C 7/08; A61C 9/0053
See application file for complete search history.

(56) References Cited

U.S. PATENT DOCUMENTS

| 613,947 A | 11/1898 | Strout |
| 2,090,904 A | 8/1937 | Singer et al. |

(Continued)

FOREIGN PATENT DOCUMENTS

| DE | 102009039880 A1 | 3/2011 |
| DE | 102012108217 A1 | 12/2013 |

(Continued)

OTHER PUBLICATIONS

"Bite-Perf: The Art of Occlusal Duplication", [retrieved form the internet on Aug. 8, 2017], URL <www.biteperf.es>, 2 pages.

(Continued)

*Primary Examiner* — Khai M Nguyen

(57) ABSTRACT

Systems and techniques for designing a digital dental matrix with improved interproximal contacts are disclosed including generating a digital three-dimensional model of a future dental anatomy of a patient, the future dental anatomy representing an intended shape of at least one tooth of the patient, selecting one or more pairs of adjacent teeth in the 3D model, for each selected pair of teeth, determining a location and orientation in the interproximal space of the adjacent teeth to insert a digital 3D geometry having one or more initial parameters, and inserting the digital 3D geometry at the determined location and orientation.

14 Claims, 12 Drawing Sheets

(51) Int. Cl.
   *A61C 7/08*          (2006.01)
   *A61C 9/00*          (2006.01)

(56)                References Cited

U.S. PATENT DOCUMENTS

| | | | |
|---|---|---|---|
| 2,674,801 | A | 4/1954 | Trangmar |
| 3,224,050 | A | 12/1965 | Redtenbacher |
| 3,482,314 | A | 12/1969 | Tofflemire |
| 4,368,040 | A | 1/1983 | Weissman |
| 4,433,959 | A | 2/1984 | Faunce et al. |
| 4,695,254 | A | 9/1987 | Herrell et al. |
| 4,704,087 | A | 11/1987 | Dragan |
| 4,713,005 | A | 12/1987 | Marshall et al. |
| 4,775,320 | A | 10/1988 | Marshall et al. |
| 4,775,430 | A | 10/1988 | Tanaka et al. |
| 4,778,386 | A | 10/1988 | Spiry |
| 4,881,898 | A | 11/1989 | Harvey et al. |
| 5,192,207 | A | 3/1993 | Rosellini |
| 5,195,889 | A | 3/1993 | Von Weissenfluh |
| 5,332,390 | A | 7/1994 | Rosellini |
| 5,382,160 | A | 1/1995 | Shemet |
| 5,487,663 | A | 1/1996 | Wilson et al. |
| 5,803,734 | A | 9/1998 | Knutson |
| 5,890,896 | A | 4/1999 | Padial |
| 6,482,314 | B1 | 11/2002 | Khare |
| 6,659,772 | B2 | 12/2003 | Margeas et al. |
| 6,776,614 | B2 | 8/2004 | Wiechmann et al. |
| 6,821,462 | B2 | 11/2004 | Schulman et al. |
| 6,845,175 | B2 | 1/2005 | Kopelman et al. |
| 7,027,642 | B2 | 4/2006 | Rubbert et al. |
| 7,056,115 | B2 | 6/2006 | Phan et al. |
| 7,092,780 | B2 | 8/2006 | Ganley et al. |
| 7,162,321 | B2 | 1/2007 | Luthardt et al. |
| 7,217,131 | B2 | 5/2007 | Vuillemot |
| 7,234,937 | B2 | 6/2007 | Sachdeva et al. |
| 7,236,842 | B2 | 6/2007 | Kopelman et al. |
| 7,442,040 | B2 | 10/2008 | Kuo |
| 7,605,817 | B2 | 10/2009 | Zhang et al. |
| 7,689,310 | B2 | 3/2010 | Kopelman et al. |
| 7,731,495 | B2 | 6/2010 | Eisenberg et al. |
| 7,801,632 | B2 | 9/2010 | Orth et al. |
| 7,956,862 | B2 | 6/2011 | Zhang et al. |
| 8,194,067 | B2 | 6/2012 | Raby et al. |
| 8,255,071 | B2 | 8/2012 | Kaigler et al. |
| 8,308,478 | B2 | 11/2012 | Primus et al. |
| 8,359,114 | B2 | 1/2013 | Steingart et al. |
| 8,366,445 | B2 | 2/2013 | Vullemot |
| 8,393,897 | B2 | 3/2013 | Clark |
| 8,491,306 | B2 | 7/2013 | Raby et al. |
| 8,527,079 | B2 | 9/2013 | Kim |
| 8,696,356 | B2 | 4/2014 | Hegyi et al. |
| 8,753,114 | B2 | 6/2014 | Vuillemot |
| 8,794,965 | B2 | 8/2014 | Latiolais et al. |
| 8,882,497 | B2 | 11/2014 | Frantz et al. |
| 8,909,363 | B2 | 12/2014 | Kopelman et al. |
| 9,308,058 | B2 | 4/2016 | Clark |
| 9,375,290 | B2 | 6/2016 | Csapo et al. |
| 9,414,895 | B2 | 8/2016 | Clark |
| 10,327,873 | B2 | 6/2019 | Fisker |
| 10,722,331 | B2 | 7/2020 | Hansen et al. |
| 10,743,968 | B2 | 8/2020 | Fisker |
| 2003/0170593 | A1 | 9/2003 | Dorfman |
| 2004/0029068 | A1 | 2/2004 | Sachdeva et al. |
| 2005/0042577 | A1 | 2/2005 | Kvitrud et al. |
| 2005/0089813 | A1 | 4/2005 | Slone et al. |
| 2005/0089814 | A1 | 4/2005 | Slone |
| 2006/0008777 | A1 | 1/2006 | Peterson et al. |
| 2006/0122719 | A1 | 6/2006 | Kopelman et al. |
| 2008/0153069 | A1 | 6/2008 | Holzner et al. |
| 2009/0104581 | A1 | 4/2009 | Simon |
| 2010/0159412 | A1 | 6/2010 | Moss et al. |
| 2011/0212420 | A1 | 9/2011 | Vuillemot |
| 2012/0029018 | A1 | 2/2012 | Lee et al. |
| 2013/0130202 | A1 | 5/2013 | Vuillemot |
| 2013/0325431 | A1 | 12/2013 | See et al. |
| 2014/0067334 | A1* | 3/2014 | Kuo ............... A61C 9/0046 703/1 |
| 2014/0172375 | A1* | 6/2014 | Grove ............... A61C 7/002 703/1 |
| 2014/0205967 | A1 | 7/2014 | Csapo et al. |
| 2015/0057782 | A1 | 2/2015 | Kopelman et al. |
| 2015/0140517 | A1 | 5/2015 | Vuillemot |
| 2015/0182301 | A1 | 7/2015 | Hegland |
| 2015/0250568 | A1 | 9/2015 | Fisker et al. |
| 2016/0015246 | A1 | 1/2016 | Clausen et al. |
| 2016/0089220 | A1 | 3/2016 | Ebert et al. |
| 2016/0143717 | A1 | 5/2016 | Samrano |
| 2016/0262860 | A1 | 9/2016 | Korten et al. |
| 2017/0119499 | A1 | 5/2017 | Clark |
| 2017/0273763 | A1 | 9/2017 | Fisker |
| 2018/0021113 | A1 | 1/2018 | Hansen et al. |
| 2018/0280116 | A1 | 10/2018 | Hansen et al. |
| 2018/0360577 | A1 | 12/2018 | Hansen et al. |
| 2019/0083208 | A1 | 3/2019 | Hansen et al. |
| 2019/0105130 | A1* | 4/2019 | Grove ............... A61C 7/002 |
| 2019/0201165 | A1 | 7/2019 | Mishaeloff |
| 2019/0298489 | A1 | 10/2019 | Dingeldein et al. |
| 2021/0035338 | A1 | 11/2021 | Sealey et al. |
| 2022/0218452 | A1* | 7/2022 | Gandrud ............... A61C 5/80 |

FOREIGN PATENT DOCUMENTS

| | | | |
|---|---|---|---|
| EP | 2400914 B1 | 8/2018 | |
| FR | 2500294 A1 | 8/1982 | |
| JP | 2008119225 A | 5/2008 | |
| JP | 2014171698 A | 9/2014 | |
| WO | 2007084727 A1 | 7/2007 | |
| WO | 2009010543 A1 | 1/2009 | |
| WO | 2009042378 A1 | 4/2009 | |
| WO | 2009158231 A1 | 12/2009 | |
| WO | 2011041193 A1 | 4/2011 | |
| WO | 2011156806 A1 | 12/2011 | |
| WO | 2016046308 A1 | 3/2016 | |
| WO | 2016066552 A1 | 5/2016 | |
| WO | 2016/094272 A1 | 6/2016 | |
| WO | 2016095272 A1 | 6/2016 | |
| WO | 2017/106419 A1 | 6/2017 | |
| WO | 2017/106431 A1 | 6/2017 | |
| WO | 2018022616 A1 | 2/2018 | |
| WO | 2018022617 A1 | 2/2018 | |
| WO | 2020033528 A1 | 2/2020 | |
| WO | 2020033532 A1 | 2/2020 | |
| WO | 2020058855 A1 | 3/2020 | |
| WO | 2020240351 A1 | 12/2020 | |

OTHER PUBLICATIONS

"Bite-perf: Training kit (English)", YouTube, [retrieved form the internet on Aug. 8, 2017], URL <http://www.youtube.com/watch?v=tCw45t_ntrA>, 1page.

"Cavity," Merriam-Webster.com Dictionary, Merriam-Webster, htips://www.merriam-webster.com/dictionary/cavity. Accessed Jan. 4, 2021, 16 pages. (2021).

3M Oral Care lecture, 2015, 16 pages.

CONTE, "A Clear PVS Matrix Technique for the Placement of Posterior Direct Composites", Dentistry Today, Apr. 30, 2008, 5 pages.

International Search Report for PCT International Application No. PCT/IB2022/057673, mailed on Feb. 12, 2022, 4 pages.

International Search Report for PCT International Application No. PCT/US2019/045479, dated Oct. 21, 2019, 5 pages.

Sarig, et al., "Proximal attrition facets: morphometric, demographic, and aging characteristics", European journal of oral sciences, Aug. 2014, vol. 122 (4), (2014), pp. 271-278.

Sarig, et al., "The arrangement of the interproximal interfaces in the human permanent dentition", Clin Oral Investigations, 2013, pp. 731-738, doi: 10.1007/s00784-012-0759-4. Epub May 2, 20126. PMID: 22638773., vol. 6, Nos. 3 and 4, (2008).

Stappert et al., "Proximal Contact Areas of the Maximiliary Anterior

(56) References Cited

OTHER PUBLICATIONS

Dentition", The International Journal of Perodontics & Restorative Dentistry, vol. 30, No. 5, (2010), pp. 471-477.

* cited by examiner

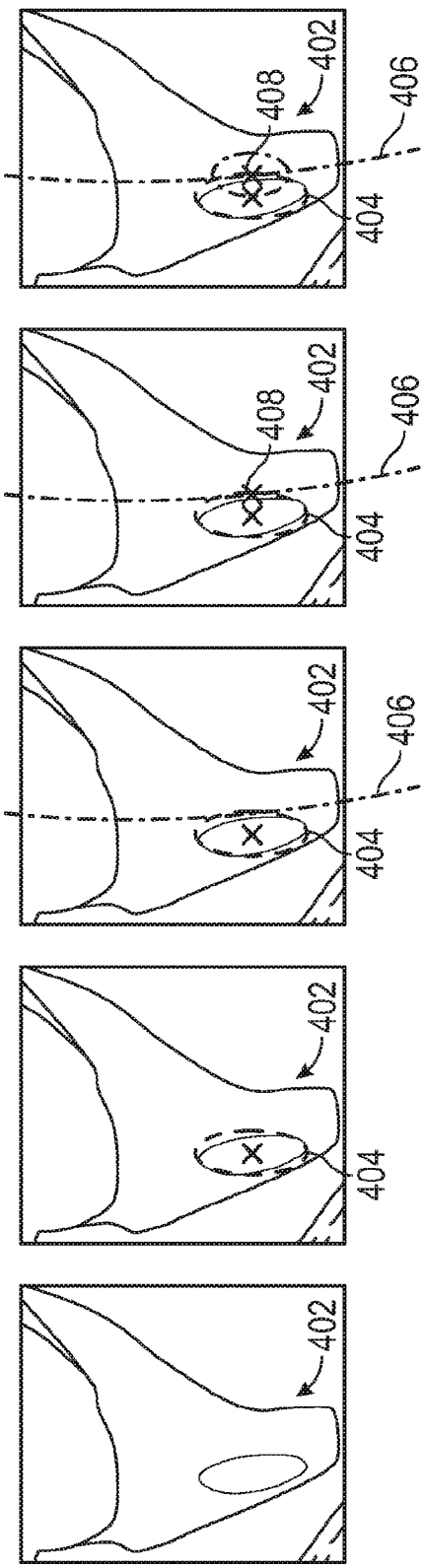

DIGITAL DESIGN OF DENTAL MATRIX WITH IMPROVED CUSTOMIZED INTERPROXIMAL CONTACTS

TECHNICAL FIELD

The present disclosure relates to dental restoration appliances for re-shaping teeth.

BACKGROUND

Dental practitioners often utilize a variety of dental appliances to re-shape or restore a patient's dental anatomy. The dental appliance may be either a stock design that is adapted with the dentist to individual patient or it may be a custom device constructed from a model of the patient's dental anatomy, augmented to a desired dental anatomy. The model may be a physical model or a digital model.

Historically, the ability to build a model to form tight, but flossible, contacts in one step has proved challenging. Instead, dental practitioners employ a process that can be both time consuming and uncomfortable for the patient to separate formed contacts with blades, saws, and other tools.

SUMMARY

The disclosure relates to techniques for designing a dental restoration appliance with improved customized interproximal contacts to reduce or eliminate the need to separate the interproximal contacts. In a first aspect, a first method includes generating a digital three-dimensional (3D) model of a future dental anatomy of a patient, the future dental anatomy representing an intended shape of at least one tooth of the patient, selecting one or more pairs of adjacent teeth in the 3D model, for each selected pair of teeth, determining a location and orientation in the interproximal space of the adjacent teeth to insert a digital 3D geometry having one or more initial parameters, and inserting the digital 3D geometry at the determined location and orientation. The one or more initial parameters of the digital 3D geometry can include at least one thickness that is greater than 100 and less than 500 microns. Furthermore, determining the location and orientation in the interproximal space can include offsetting the adjacent teeth causing the respective geometries of the adjacent teeth to intersect, determining a Boolean intersection result of the adjacent teeth, and determining a best fit plane based on the Boolean intersection result. In addition, determining the location and orientation in the interproximal space can include determining a point of contact between the adjacent teeth, determining a landmarking coordinate system for each one of the adjacent teeth, determining an average of the landmarking coordinate system based the landmarking coordinate for each one of the adjacent teeth, determining the orientation based on the determined average of the landmarking coordinate systems, and determining the location based on the point of contact between the adjacent teeth. The method can further include refining the digital 3D geometry. Refining the digital 3D geometry can include subdividing the 3D geometry into one or more portions between the lingual and facial ends of the 3D geometry and translating one or more portions of the 3D geometry relative to the digital 3D model to adjust the resulting 3D geometry within the digital 3D model. Refining the 3D digital geometry can also include placing a pre-defined 3D geometry at a location and orientation relative to the 3D model and scaling the pre-defined 3D geometry based on or more parameters of the 3D model. Refining the digital 3D geometry can also include the 3D geometry vertically into at least a first portion and a second portion and adjusting one or more parameters of each respective portion to adjust the resulting 3D geometry within the digital 3D model. The parameters can include at least one of a first thickness along the mesial-distal axis, a distance along the gingival-occlusal axis, and an offset of each respective portion. The parameters of each respective portion can be different for each of the respective portions. The method can further include generating a file that represents a 3D dimensional physical matrix that includes the 3D model and the refined 3D geometry and generating the physical matrix from the representation. Generating the physical matrix from the representation can include using a 3D printer to construct the physical matrix from the representation. In addition, the refining of the 3D geometry can include adding an ovoid cylinder to each instance of the digital 3D geometry, and the ovoid cylinder is bisected by the respective digital 3D geometry, for each added ovoid, aligning the respective ovoid midplane to the respective digital 3D geometry, for each digital 3D geometry, determining an angle between a respective parting surface and the respective 3D digital geometry, and for each digital 3D geometry, rotating the respective digital 3D geometry based on the respective determined angle causing the respective ovoid to match the tooth inclination of the respective teeth.

In a second aspect, a second method can include generating a digital three-dimensional (3D) model of a future dental anatomy of a patient, the future dental anatomy representing an intended shape of at least one tooth of the patient, selecting one or more pairs of teeth in the 3D model, wherein the teeth in the pair are adjacent, for each selected pair of teeth, determining a location and orientation in the interproximal space of the adjacent teeth to insert a digital 3D geometry having one or more initial parameters, inserting the digital 3D geometry at the determined location and orientation, refining the digital 3D geometry, generating a file that represents a 3D dimensional physical matrix that includes the 3D model and the refined 3D geometry, and generating the physical matrix from the representation.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating an example technique for optimizing contact geometry, in accordance with various aspects of this disclosure.

DETAILED DESCRIPTION

Figure 1:
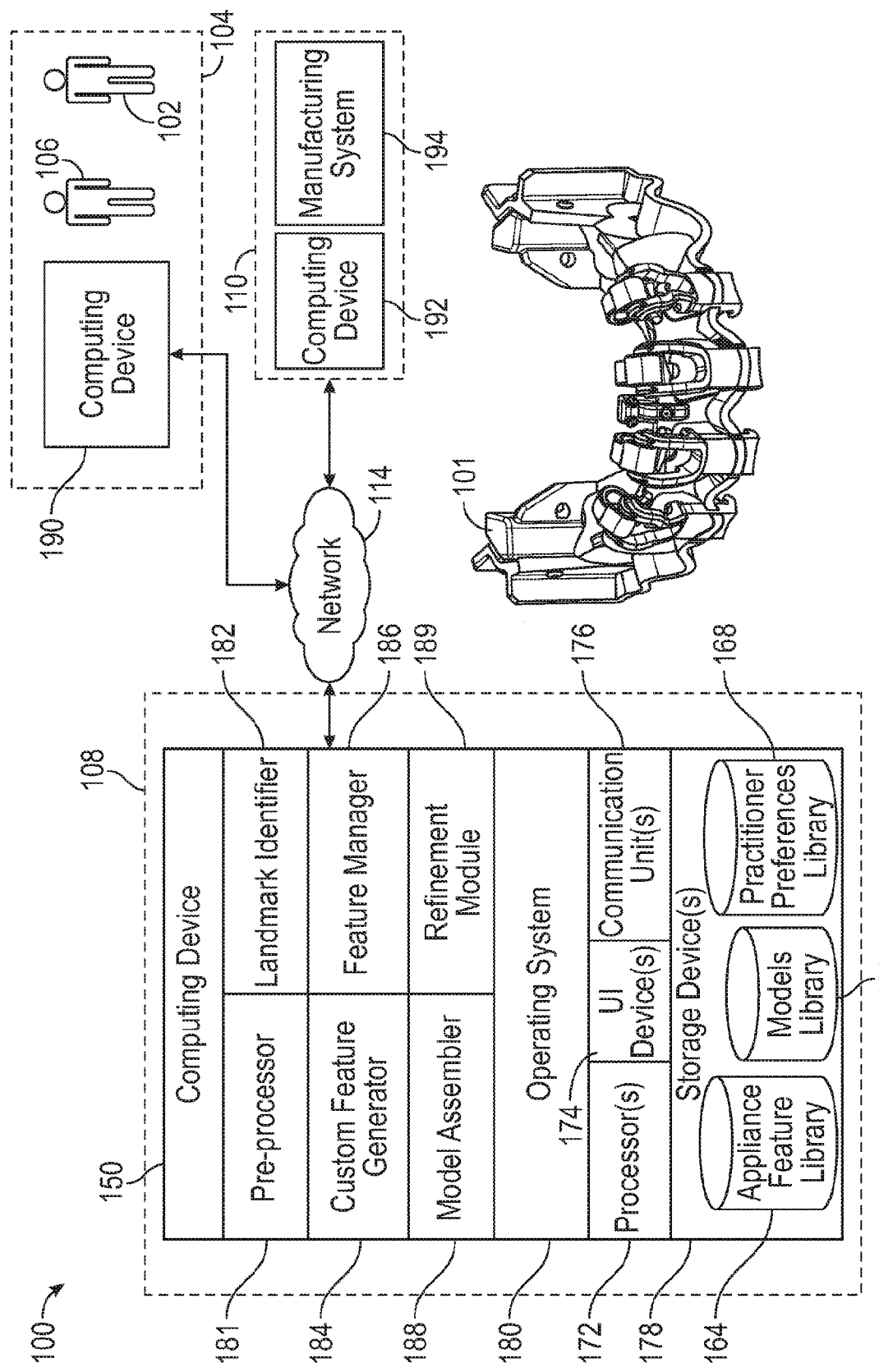
FIG. 1 is a block diagram illustrating an example system for designing and manufacturing a dental appliance with improved customized interproximal contacts for restoring the dental anatomy of a patient, in accordance with various aspects of this disclosure.

FIG. 1 is a block diagram illustrating an example system 100 for designing and manufacturing a dental appliance for restoring the dental anatomy of a patient, in accordance with various aspects of this disclosure. In the example of FIG. 1, system 100 includes clinic 104, appliance design facility 108, and manufacturing facility 110.

Practitioner 106 may treat patient 102 at clinic 104. For example, practitioner 106 may create a digital model of the current dental anatomy of patient 102. The dental anatomy may include any portion of crowns or roots of one or more teeth of a dental archform, gingiva, periodontal ligaments, alveolar bone, cortical bone, implants, artificial crowns, bridges, veneers, dentures, orthodontic appliances, or any structure that could be considered part of the dentition before, during, or after treatment. In one example, the digital model of the current dental anatomy includes a three-dimensional (3D) model of the current dental anatomy of the patient. The 3D model may be generated using an intra-oral scanner, Cone Beam Computed Tomography (CBCT) scanning (i.e., 3D X-ray), Optical Coherence Tomography (OCT), Magnetic Resonance Imaging (MRI), or any other 3D image capturing system. In some examples, computing device 190 stores a digital model of a current dental anatomy of patient 102.

Computing device 190 of clinic 104 may store a digital model of a future dental anatomy for the patient. The future dental anatomy represents the intended shape of the dental anatomy to be achieved by application of a dental appliance, such as dental appliance 101. In one example, practitioner 106 may create a physical model of the future dental anatomy and may utilize an image capturing system (e.g., as described above) to generate the digital model of the future dental anatomy. In another example, practitioner 106 may modify the digital model of the current anatomy of patient 102 (e.g., by adding material to a surface of one or more teeth of the dental anatomy) to generate the digital model of the future dental anatomy. In yet another example, computing device 190 may modify the digital model of the current dental anatomy to generate a model of the future dental anatomy. In another example, the modification of the dental anatomy of the patient may occur offsite by a $3^{rd}$ party provider. Such modifications may be prescribed, reviewed, and modified by, or under the direction of, the practitioner 106. The dental anatomy may be designed in a digital environment, alternatively a physical rendering of the initial dentition may be physically modified using conventional dental laboratory techniques (e.g. application of wax). This physical model of the teeth may be digitized via a 3D scanner.

In one scenario, computing device 190 outputs the digital model representing the dental anatomy (e.g., current and/or future) of patient 102 to another computing device, such as computing device 150 and/or computing device 192. As illustrated in FIG. 1, in some examples, computing device 150 of design facility 108, computing device 190 of clinic 104, and computing device 192 of manufacturing facility 110 may be communicatively coupled to one another via network 114. Network 114 may include a wired or wireless network, such as via WIFI®, BLUETOOTH®, 3G, 4G LTE, 5G, and the like.

In the example of FIG. 1, design facility 108 includes computing device 150 configured to automatically design a dental appliance for re-shaping the dental anatomy of patient 102. In one example, computing device 150 includes one or more processors 172, one or more user interface (UI) devices 174, one or more communication units 176, and one or more storage devices 178.

UI device 174 may be configured to receive user input and/or output information, also referred to as data, to a user of computing device 150. One or more input components of UI device 174 may receive input. Examples of input are tactile, audio, kinetic, and optical input, to name only a few examples. For example, UI device 174 may include a mouse, keyboard, voice responsive system, video camera, buttons, control pad, microphone, or any other type of device for detecting input from a human or machine. In some examples, UI device 174 may be a presence-sensitive input component, which may include a presence-sensitive screen, touch-sensitive screen, etc.

One or more output components of UI device 174 may generate output. Examples of output are data, tactile, audio, and video output. Output components of UI device 174, in some examples, include a display device (e.g., a presence-sensitive screen, a touch-screen, a liquid crystal display (LCD) display, a Light-Emitting Diode (LED) display, an optical head-mounted display (HMD), among others), a light-emitting diode, a speaker, or any other type of device for generating output to a human or machine.

Processor 172 represents one or more processors such as a general-purpose microprocessor, a specially designed processor, an application specific integrated circuit (ASIC), a field programmable gate array (FPGA), a collection of discrete logic, or any type of processing device capable of executing the techniques described herein. In one example, storage device 178 may store program instructions (e.g., software instructions or modules) that are executed by processor 172 to carry out the techniques described herein. In other examples, the techniques may be executed by specifically programmed circuitry of processor 172. In these or other ways, processor 172 may be configured to execute the techniques described herein.

Storage device 178 may, in some examples, also include one or more computer-readable storage media. Storage device 178 may be configured to store larger amounts of data than volatile memory. Storage device 178 may further be configured for long-term storage of data as non-volatile memory space and retain data after activate/off cycles. Examples of non-volatile memories include, solid state drives (SSDs), hard disk drives (HDDs), flash memories, or forms of electrically programmable memories (EPROM) or electrically erasable and programmable (EEPROM) memories. Storage device 178 may store program instructions and/or data associated with software components 182-189 and/or operating system 180.

In the example of FIG. 1, storage device 178 includes appliance feature library 164, models library 166, and practitioner preferences library 168. Libraries 164, 166, and 168 may include relational databases, multi-dimensional databases, maps, and hash tables, or any data structure that stores data. In one example, models library 166 includes 3D models of the patient's current and/or future dental anatomy. As described in more detail below, the libraries 164, 166, and 168, may include representations of interproximal 3D geometries. In some instances, libraries 164, 166, and 168 may be stored locally at computing device 150 or may be accessed via a networked file share, cloud storage, or other remote datastore.

Computing device 150 may execute software components 182-189 with one or more processors 172. Computing device 150 may execute any of components 182-189 as or within a virtual machine executing on underlying hardware. In one example, any of components 182-189 may be implemented as part of operating system 180.

In accordance with the techniques of this disclosure, computing device 150 automatically or semi-automatically generates a digital model of dental appliance 101 for restoring the dental anatomy of patient 102 based on a digital model of the patient's future dental anatomy. Pre-processor 181 may pre-process the digital model of the future dental anatomy of patient 102. In one example, pre-processor 181 performs pre-processing to identify one or more teeth in the future dental anatomy of patient 102. In some instances, pre-processor 181 identifies a local coordinate system for each individual tooth and may identify a global coordinate system that includes each tooth of the future dental anatomy. As another example, pre-processor 181 may pre-process the digital model of the future dental anatomy to identify the root structure of the dental anatomy. In another example, Pre-processor 181 may identify the gingiva. In this way, pre-processor 181 may determine portions of the future dental anatomy that include gingiva and portions of the future dental anatomy that include tooth. As yet another example, pre-processor 181 may pre-process the digital model of the future dental anatomy by extending the roots to identify the top surface of the root of each respective tooth.

Landmark identifier 182 may determine one or more landmarks of the future dental anatomy. Example landmarks include a slice, a midpoint, a gingival boundary, a closest point between two adjacent teeth (e.g., a point of contact between adjacent teeth or a point of closest approach (or closest proximity), a convex hull, a center of mass, or other landmark. A slice refers to a cross section of the dental anatomy. The midpoint of a tooth refers to a geometric center (also referred to as a geometrical midpoint) of the tooth within a given slice. The gingival boundary refers to a boundary between the gingiva and one or more teeth of the dental anatomy. A convex hull refers to a polygon whose vertices include a subset of the vertices in a given set of vertices, where the boundary of the subset of vertices circumscribes the entire set of vertices. The center of mass of a tooth refers to a midpoint, center point, centroid, or geometric center of the tooth. In some instances, landmark identifier 182 determines the landmarks in the local coordinate system for each tooth.

In some examples, landmark identifier 182 determines a plurality of slices of the patient's future dental anatomy. In one example, the thickness of each slice is the same. In some instances, the thickness of one or more slices is different than the thickness of another slice. The thickness of a given slice may be pre-defined. In one instance, landmark identifier 182 automatically determines the thickness of each slice. In another instance, the thickness of each slice may be user-defined.

Landmark identifier 182 determines, in some examples, a midpoint for each tooth. In one example, landmark identifier 182 determines a midpoint of a particular tooth by computing the extrema of the particular tooth's geometry based on the entirety of the particular tooth (e.g., without dividing the dental anatomy into slices) and determine the midpoint of the particular tooth based on the extrema of the tooth geometry.

In some examples, landmark identifier 182 determines a midpoint for each tooth for each slice. Landmark identifier 182 may determine the midpoint for a particular slice of a particular tooth by calculating the center of mass of a constellation of vertices around the edge of the particular tooth for that particular slice. In some instances, the midpoint of the particular tooth for the particular slice may be biased toward one edge of the tooth (e.g. in the case that one edge has more points than another edge).

In another example, landmark identifier 182 may determine the midpoint of a particular tooth in a particular slice based on a convex hull of the particular tooth for the particular slice. For example, landmark identifier 182 may determine a convex hull of a set of edge points of the tooth for a given slice. Landmark identifier 182 determines, in some instances, a geometric center from the convex hull by performing a flood-fill operation on the region circumscribed by the convex hull and computing a center of mass of the flood-filled convex hull.

In some examples, landmark identification module 182 determines a closest point between two adjacent teeth. The closest point between two adjacent teeth may be a point of contact or a point of closest approach. In one example, landmark identification module 182 determines a closest point between two adjacent teeth for each slice. In another example, landmark identification module 182 determines a closest point between two adjacent teeth based on the entirety of the adjacent teeth (e.g., without dividing the dental anatomy into slices).

A spline refers to a curve that passes through a plurality of points or vertices, such as a piecewise polynomial parametric curve. A mold parting surface refers to a 3D mesh that bisects two sides of one or more teeth (e.g., separates the facial side of one or more teeth from the lingual side of the one or more teeth). A gingival trim surface refers to a 3D mesh that trims an encompassing shell along the gingival margin. A shell refers to a body of nominal thickness. In some examples, an inner surface of the shell matches the surface of the dental arch and an outer surface of the shell is a nominal offset of the inner surface. The facial ribbon refers to a stiffening rib of nominal thickness that is offset facially from the shell. A window refers to an aperture that provides access to the tooth surface so that dental composite can be placed on the tooth. A door refers to a structure that covers the window. An incisal ridge provides reinforcement at the incisal edge of dental appliance 101 and may be derived from the archform. The case frame sparing refers to connective material that couples parts of dental appliance 101 (e.g., the lingual portion of dental appliance 101, the facial portion of dental appliance 101, and subcomponents thereof) to the manufacturing case frame. In this way, the case frame sparing may tie the parts of dental appliance 101 to the case frame during manufacturing, protect the various parts from damage or loss, and/or reduce the risk of mixing-up parts.

In some examples, custom feature generator 184 generates one or more splines based on the landmarks. Custom feature generator 184 may generate a spline based on a plurality of tooth midpoints and/or closest points between adjacent teeth (e.g., points of contact between adjacent teeth or points of closest proximity between adjacent teeth). In some instances, custom feature generator 184 generates one spline for each slice. In one instance, custom feature generator 184 generates a plurality of splines for a given slice. For instance, custom feature generator 184 may generate a first spline for a first subset of teeth (e.g., right posterior teeth), a second spline for a second subset of teeth (e.g., left posterior teeth), and a third spline for a third subset of teeth (e.g., anterior teeth).

Appliance feature library 164 includes a set of pre-defined appliance features that may be included in dental appliance 101. Appliance feature library 164 may include a set of pre-defined appliance features that define one or more functional characteristics of dental appliance 101. Examples of pre-defined appliance features include vents, rear snap clamps, door hinges, door snaps, an incisal registration feature, center clips, custom labels, a manufacturing case frame, a diastema matrix handle, among others. Each vent is configured to enable excess dental composite to flow out of dental appliance 101. Rear snap clamps are configured to couple a facial portion of dental appliance 101 with a lingual portion of dental appliance 101. Each door hinge is configured to pivotably couple a respective door to dental appliance 101. Each door snap is configured to secure a respective door in a closed position. In some examples, an incisal registration feature comprises a male and female tab pair that falls on the incisal edge of dental appliance 101 (e.g., along the midsagittal). In one example, the incisal registration feature is used to maintain vertical alignment of a facial portion of dental appliance 101 and a lingual portion of dental appliance 101. Each center clip is configured to provide vertical registration between the lingual portion of dental appliance 101 and the facial portion of dental appliance 101. Each custom label includes data identifying a part of dental appliance 101. The manufacturing case frame is configured to support one or more parts of dental appliance 101. For example, the manufacturing case frame may detachably couple a lingual portion of dental appliance 101 and a facial portion of dental appliance 101 to one another for safe handling and transportation of dental appliance 101 from manufacturing facility 110 to clinic 104.

According to other implementations, appliance feature library 164 can be configured to include one or more interproximal geometries that are inserted between adjacent teeth. This pre-defined geometry may include a library part, scaled geometry, and/or parametric shapes, to name a few examples. For instance, the appliance feature library 164 may include 3D fins of a uniform thickness. As another example, appliance feature library 164 may include 3D fins that are subdivided with each subdivision having a respective thickness, and the respective thickness can be altered to better conform with the spacing and orientation of the adjacent teeth. In general, the fins can have an initial thickness between 100 and 500 microns, according to particular implementations. For example, in one implementation, fins having a uniform thickness of 150 microns are stored in the appliance feature library 164. And in yet another example, appliance feature library 164 may include ovoid cylinders that can be placed within interproximal spaces between adjacent teeth. Techniques for placing and refining interproximal geometries are described in more detail below.

Feature manager 186 determines the parameters of one or more pre-defined appliance features that are included in pre-defined appliance feature library 164. In one example, the pre-defined appliance features are configured to perform functionality of dental appliance 101. The parameters of the pre-defined appliance features may include the size, shape, scale, position, and/or orientation of the pre-defined appliance features. Feature manager 186 may determine the parameters of the pre-defined appliance features based on one or more rules. The rules may be pre-programmed or machine generated, for instance, via machine learning.

Feature manager 186 determines, in some instances, a placement of a rear snap clamp based on the rules. In one example, feature manager 186 positions two rear snap clamps along the archform on opposite ends of the archform (e.g., a first snap clamp at one end and a second snap clamp at another end). In some examples, feature manager 186 positions the rear snap clamps one tooth beyond the outermost teeth to be restored. In some examples, feature manager 186 positions a female portion of the rear snap clamp on the lingual side of the parting surface and positions a male portion of the rear snap clamp on the facial side.

In some examples, feature manager 186 determines a placement of a vent based on the rules. In one example, feature manager 186 positions the vent at the midline of a corresponding door on the incisal side of dental appliance 101.

In some scenarios, feature manager 186 determines a placement of a door hinge based on the rules. In one scenario, feature manager 186 positions each door hinge at the midline of a corresponding door. In one scenario, feature manager 186 positions the female portion of the door hinge to anchor to the facial portion of dental appliance 101 (e.g., towards the incisal edge of a tooth) and positions the male portion of the door hinge to anchor to the outer face of the door.

In one instance, feature manager 186 determines a placement of a door snap based on the rules by positioning the door snap along a midline of a corresponding door. In one instance, feature manager 186 positions the female portion of the door snap to anchor to an outer face of the door and extends downward toward the gingiva. In another instance, feature manager 186 positions the male portion of the door snap to anchor to the gingival side of the facial ribbon. For instance, the door snap may secure the door in a closed position by latching the male portion of the door snap to the facial ribbon.

In other examples, feature manager 186 may determine an initial placement, orientation, and thickness of one or more interproximal geometries in accordance with this disclosure.

Feature manager 186 may determine the parameters of a pre-defined appliance feature based on preferences of practitioner 102. Practitioner preferences library 168 may include data indicative of preferences of various practitioner 102. In one example, practitioner preferences directly affect the parameters of one or more appliance features. For example, practitioner preferences library 168 may include data indicating a preferred size of various appliance features, such as the size of the vents. In such examples, larger vents may enable the pressure of the dental composite or resin to reach equilibration faster during the door seating process but may result in a larger nub to finish after curing. In other examples, practitioner preferences library 168 may include data indicating a preferred initial size or shape of the interproximal geometries.

As another example, practitioner preferences indirectly affect the parameters of appliance features. For example, practitioner preferences library 168 may include data indicating a preferred stiffness of the appliance or a preferred tightness of the self-clamping feature. Such preference selections may also affect more complex design changes to section thickness of the matrix and or degree of activation of the clamping geometry. Feature manager 186 may determine the parameters of the appliance features by applying the practitioner preferences to one or more rules, a simulation (e.g., Monte Carlo) or finite element analysis. Feature parameters also may be derived from properties in the materials to be used with the matrix, such as type of composite that the dentist prefers to use with the appliance.

Model assembler 188 generates a digital 3D model of dental appliance 101 used to re-shape the dental anatomy (e.g., to the future dental anatomy) in response to determining the parameters of the custom and pre-defined appliance features. The digital model of dental appliance 101 may include a point cloud, 3D mesh, NURBS or other digital representation of dental appliance 101. In some instances, model assembler 188 stores the digital model of dental appliance 101 in models library 166.

Model assembler 188 may output the digital model of dental appliance 101. For example, model assembler 188 may output the digital model of dental appliance 101 to computing device 192 of manufacturing facility 110 (e.g., via network 114) to manufacture dental appliance 101. In another example, computing device 150 sends the digital model of dental appliance 101 to computing device 190 of clinic 104 for manufacturing at clinic 104. In some implementations, the model assembler 188 generates a computer-readable file that includes data describing the digital model of dental appliance 101. This file may be stored in storage devices 164 and the file may be referenced by the system 100 in the future to refine the previous digital model or by the manufacturing system 194 to manufacture a physical matrix of the digital model.

Refinement module 189 can be used to refine the digital model of dental appliance 101. For instance, the refinement module 189 can be used to modify one or more parameters of the digital model. In some implementations, the modification to the digital model includes modifying one or more parameters of the inserted interproximal geometries. Refinement module 189 can be configured to incrementally modify the digital model in response to received user input (e.g., from practitioner 106) or may be configured to automatically refine the digital geometry using predefined rules or based on machine learning techniques.

In some implementations, the refinement module 189 may also graphically present the incremental refinements in real-time as the parameters of the digital model are being changed. For example, as the thickness or position of an interproximal fin is being modified in accordance with received user input, the refinement module 189 can update the parameters of the modified interproximal fin and demonstrate via UI devices 174 any changes to the interproximal fins relative to the digital model in real-time. In other implementations, the refinement module 189 can graphically present final refinements that are automatically computed using predefined rules or machine learning.

An advantage of graphically presenting the refinements (either incrementally or upon completion of the refinements) is that a user of system 100 (e.g., the practitioner 106) can visually inspect the digital model of dental appliance 101 before the model is provided to the manufacturing system 194. In some implementations, one or more aspects of the digital model of dental appliance 101 can be provided to the refinement module 189 before the system 100 provides the digital model to the model assembler 188.

Computing device 192 may send the digital model of dental appliance 101 to manufacturing system 194. Manufacturing system 194 manufactures dental appliance 101 according to the digital model of dental appliance 101. Manufacturing system 194 may form dental appliance 101 using any number of manufacturing techniques, such as 3D printing, chemical vapor deposition (CVD), thermoforming, injection molding, lost wax casting, milling, machining, laser cutting, among others.

Practitioner 106 may receive dental appliance 101 and may utilize dental appliance 101 to re-shape one or more teeth of patient 102. For example, practitioner 106 may apply a dental composite to the surface of one or more teeth of patient 102 via one or more doors of dental appliance 101. Excess dental composite may be removed via one or more vents. In some situations, the presence of interproximal geometries in the dental appliance 101 gives practitioner 106 better control of the amount dental composite, or bonding material, used during a filling procedure with patient 102. In general, advantages of using the techniques described herein include greatly reducing the need of practitioner 106 to remove excess dental composite. That can result in decreasing the time to treat patient 102 using the dental appliance 101 and limiting the practitioner's 106 to use saws, blades, and other tools to separate interproximal dental composite after it has cured.

In some examples, model assembler 188 generates a digital model of dental appliance 101 based on an existing digital model (e.g., stored in models library 166). In one example, models library 166 may include data indicative of appliance success criteria associated with each completed dental appliance 101, the appliance success criteria indicating a manufacturing print yield, practitioner and/or customer feedback or ratings, or a combination thereof. For example, model assembler 188 may utilize an existing digital model to generate a new or updated digital model of a dental appliance 101 in response to determining the appliance success criteria for the previous dental appliance 101 satisfy a threshold criteria (e.g., a threshold manufacturing yield, or a threshold practitioner rating). In one example, the existing digital model is a template or reference digital model. In such examples, model assembler 188 may generate a digital model of a dental appliance 101 based on the template digital model. For example, the template digital model may be associated with different characteristics of a potential patient's dental anatomy, such as the patient having small teeth or being unable to open the mouth widely.

In one example, model assembler 188 generates a digital model of a dental appliance 101 based on an existing digital model by utilizing one or more morphing algorithms. For example, model assembler 188 may utilize morphing algorithms to interpolate appliance feature geometries. In one instance, model assembler 188 may generate a new digital model of a dental appliance 101 based on the design of the existing digital model. In one instance, the design feature of an existing digital model may include a window inset from the perimeter, such that model assembler 188 may morph the geometry of the existing digital model based on landmarks for a different dental anatomy.

Techniques of this disclosure may enable a computing device to automatically determine the shape of dental appliance 101 and the placement of various appliance features. In this way, the computing device may more accurately and more quickly generate a digital model of a dental appliance 101. More accurately determining the shape of dental appliance 101 and the placement of the appliance features may increase the efficacy of dental appliance 101 and the tooth restoration. Determining the shape of dental appliance 101 and placement of the appliance features more quickly may enable the practitioner to correct a patient's teeth more quickly, which may improve the appearance and/or functionality of the patient's teeth, thereby potentially improving the patient experience. Additionally, reducing the time required to generate the digital model of a dental appliance 101 may reduce the cost of production and making treatment affordable for a wider set of patients.

While computing device 150 is described as automatically generating a digital model of dental appliance 101 based on a digital model of a future dental anatomy of the patient, in some examples, computing device 150 may utilize a digital model of the current, unrestored state of the dental anatomy of the patient to generate all or part of the digital model of dental appliance 101. For example, computing device 150 may utilize a digital model of the current dental anatomy to determine the position of snap clamps (which may be placed on teeth that are not to be restored) or generate the facial ribbon (e.g., as the gingival margin may not change during restoration).

Figure 2:
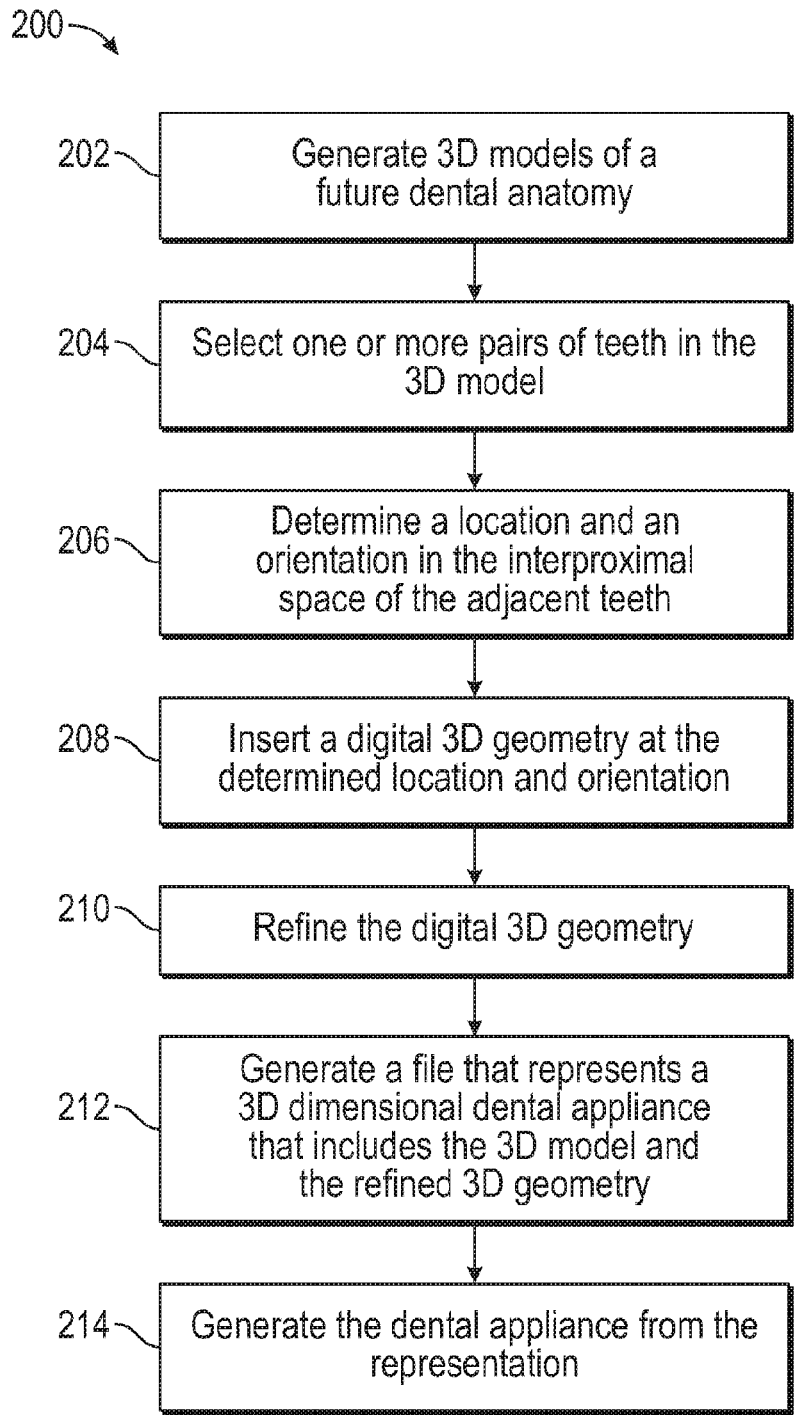
FIG. 2 is a flow diagram illustrating an example technique for generating a digital model of a dental appliance with improved customized interproximal contact, in accordance with various aspects of this disclosure.

FIG. 2 is a flow diagram illustrating an example technique 200 for generating a digital model of a dental appliance, in accordance with various aspects of this disclosure. FIG. 2 is described in the context of system 100 illustrated in FIG. 1.

At step 202, computing device 150 receives a digital 3D model of a future (i.e., desired) dental anatomy for a patient 102. In one example, computing device 150 receives the digital model of the future dental anatomy from another computing device, such as computing device 190 of clinic 104. The digital model of the future dental anatomy of the patient may include a point cloud or 3D mesh of the future dental anatomy. A point cloud includes a collection of points that represent or define an object in 3-dimensional space. A 3D mesh includes a plurality of vertices (also referred to as points) and geometric faces (e.g., triangles) defined by the vertices. In one example, practitioner 106 creates a physical model of the future dental anatomy and utilizes an image capturing system to generate the digital model of the future dental anatomy. In another example, practitioner 106 modifies the digital model of the current anatomy of patient 102 (e.g., by adding material to a surface of one or more teeth of the dental anatomy) to generate the digital model of the future dental anatomy. In some cases, selective removal of tooth structure may be planned. In others, the designed future anatomy may consider dentist preference for subsequent treatment steps where, for instance, tooth embrasures may be over contoured in the digital model, because the dentist prefers to be able to hand adjust them during subsequent finishing. In yet another example, computing device 190 may modify the digital model of the current dental anatomy to generate a model of the future dental anatomy. As an alternative to practitioners or computers or appliance manufacturers creating the future dental anatomy, $3^{rd}$ party laboratories and technicians may be engaged in all or part of the dentition design work.

At step 204, computing device 150 selects one or more pairs of teeth in the 3D model. For example, the computing device 150 can perform a search on the digital model and identify portions of the 3D mesh that represent the teeth present in the 3D model to automatically select portions of the 3D mesh that correspond to a pair of adjacent teeth. In other implementations, the teeth can be selected in response to user input. For example, a user can draw a bounding box around portions of the mesh that represent teeth and the computing device 150 can select those teeth in response to the user input. In other words, one or more teeth can be selected by computing device 150 using manual techniques (e.g., responsive to user input that highlights the specific elements of the 3D mesh that belong to the adjacent tooth pair) or automatic techniques (e.g., detecting the curvature change between adjacent mesh elements that represent tooth boundaries or applying tooth templates to the 3D mesh and determining tooth segmentation based on the applied templates). In addition, various combinations of automatic tooth segmentation, landmark identification and/or tooth identification algorithms may be used. Further deep learning algorithms may be used to assess the confidence in the automatic selection and flag selected tooth pairs for further review.

At step 206, for each pair of selected teeth, the computing device 150 determines a location and orientation in the interproximal space between the selected adjacent teeth to insert a digital 3D geometry. There are several techniques that the computer device 150 can use to determine the location and orientation. In one example, the computing device 150 uses a Boolean intersection of the offset of the adjacent teeth to determine a best fit plane. The use of Boolean intersection is described in more detail, for example, in relation to FIGS. 3A-3B. In another example, the computing device 150 uses landmarking coordinate systems to determine the location and orientation. The use of landmarking coordinate systems is described in more detail elsewhere, for example, in relation to FIGS. 4 and 5.

At step 208, computing device 150 inserts a digital 3D geometry at the determined location and orientation. For instance, a 3D fin can be inserted between the 3D meshes representing the adjacent teeth based on the determined location and orientation.

At step 210, computing device 150 refines the digital 3D geometry using refinement module 189. For instance, the refinement module 189 can receive user input and in response to the received user input modify a thickness parameter of one or more portions of the 3D fin. As another example, responsive to user input, the refinement module 189 can translate one or more portions of the 3D fin to reposition the respective portions in the interproximal space between the adjacent teeth. Such a refinement module may also refine the shape and cross section of the 3D fin to, for instance, create a ramp or a curve to improve the local strength, flexibility, registration to adjacent tooth structure, or ability of the fin to create desired geometry in the restoration while maintaining mechanical integrity throughout the molding, curing and removal process.

At step 212, computing device 150 generates a file that represents a 3D dimensional dental appliance (such as dental appliance 101) that includes the 3D model and the refined 3D geometry. For example, the computing device 150 can generate a file that specifies the 3D model using any number of conventional techniques.

At step 214, computing device 150 generates the dental appliance 101 from the representation. For instance, the computing device 150 can transmit the file to the manufacturing system 194 that can generate the dental appliance 101 using any number of techniques, including 3D printing, CVD, thermoforming, injection molding, lost wax casting, milling, machining, laser cutting, among others.

Figure 3A:
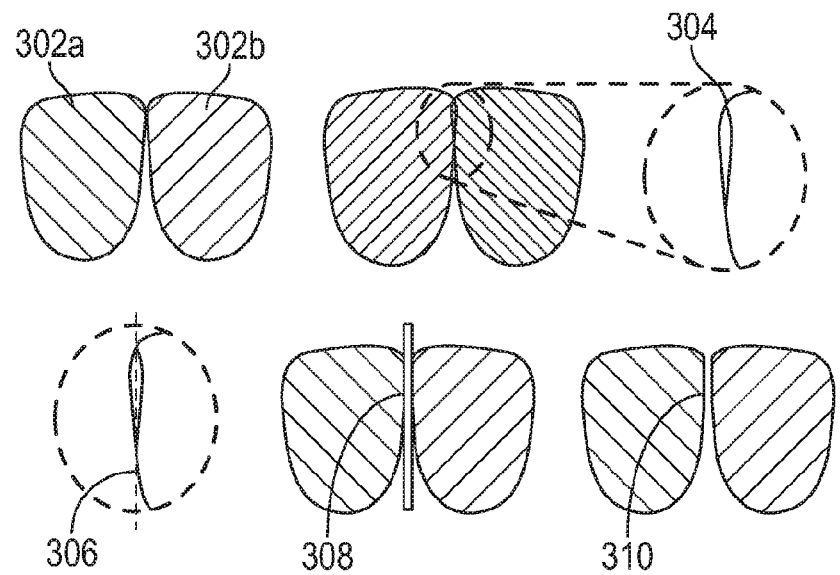
FIGS. 3A and 3B are conceptual diagrams illustrating example techniques for using a Boolean intersection result to determine a location and orientation for inserted interproximal geometry, in accordance with various aspects of this disclosure.
Figure 3B:
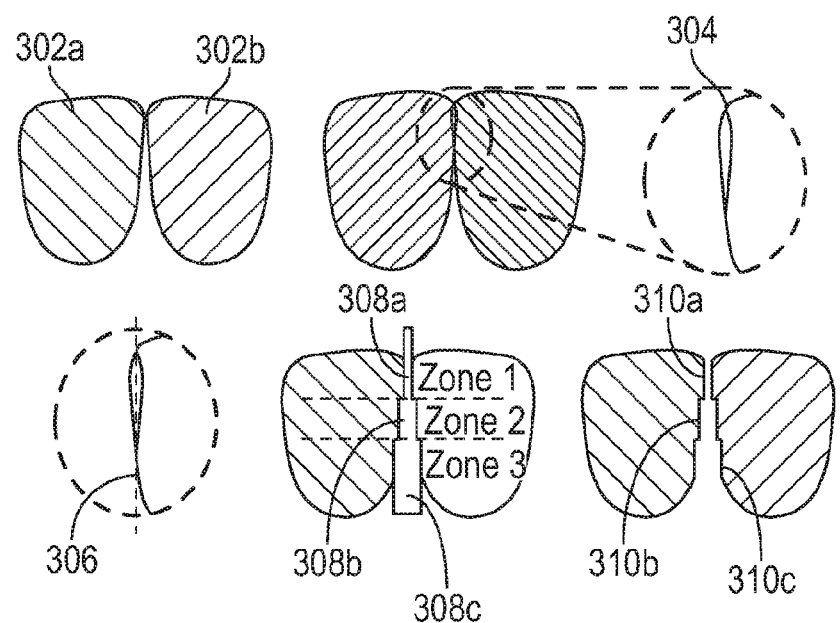

FIGS. 3A and 3B are conceptual diagrams illustrating example techniques for using a Boolean intersection result to determine a location and orientation for inserted interproximal geometry, in accordance with various aspects of this disclosure. The conceptual diagram is described in the context of system 100. For instance, the FIGS. 3A and 3B are described in the context of computing device 150.

According to particular implementations, the computing device 150 offsets, or translates, the 3D meshes representing the adjacent teeth 302a and 302b causing the 3D meshes to intersect. The intersection 304 of the adjacent teeth 302a and 302b can be of various widths. For instance, in one implementation, the 3D meshes are offset so that they cause an intersection 304 of no more 100 microns. Specifically, in the example, each 3D mesh representing the adjacent teeth 302a and 302b are offset by 50 microns individually, which results in a 100-micron intersection. Next, the computing device 150 determines a Boolean intersection result of the overlapping meshes. For example, using a Boolean intersection technique, the computing device 150 identifies and keeps the portion of the 3D meshes that are overlapping and discards the portion of the 3D meshes that do not overlap.

After the computing device 150 performs the Boolean intersection, the computing device 150 can also determine a best fit plane 306 of the remaining 3D meshes that corresponds to the adjacent teeth 302a and 302b. There are various techniques for determining best fit plane 306. For instance, an iterative process can be used whereby a plane is generated and the plane's positioned refined until the average distance between each vertex of the intersection mesh and generated plane is minimized. Once a best fit plane 306 is determined the computing device 150 can thicken the plane. For example, as illustrated in FIG. 3A, the plane 308 is of a uniform thickness, such 150 microns. To complete the model refinement, the computing device 150 can perform a Boolean subtraction to generate a mode refinement that includes an interproximal space 310 for which 3D geometry can be inserted therein. This causes the 3D meshes corresponding to the adject teeth 302a and 302b to separate by the selected thickness within the model.

FIG. 3B illustrates a similar technique to the one shown in FIG. 3A. The primary difference is that, as illustrated in FIG. 3B, the plane is subdivided into regions (or zones) 508a, 508b, and 508c, with allows the computing device 150 to specify different parameters for each of the subdivisions. For instance, the computing device 150 can specify a first thickness of region 508a relative to the mesial-distal axis and a first distance along the gingival-occlusal axis. This allows the computing device 150 to generate a better fit for interproximal geometry that is inserted into the interproximal spaces 310a to 310c. That said, while FIG. 3B shows the best fit plane being subdivided into three regions, it should be understood that the best fit plane can be subdivided into any number of regions to refine the model according to the patient 102's needs. It also should be understood that the thickness may be zero and/or include values below the resolution limit of the fabrication device. In other examples, the geometries can be controlled to be greater than the proven minimal resolution of the fabrication device to assure that all of features of the device can be repeatedly fabricated, inspected and delivered into clinical use, irrespective of daily process variations of the fabrication device.

FIG. 4 is a block diagram illustrating an example technique for optimizing contact geometry, in accordance with various aspects of this disclosure. In some situations, the intersection or contact area between teeth may not occur in a convenient location with respect to the digital representation of the dental appliance 101. FIG. 4 shows one example technique for how an initially determined location could be mapped to a more ideal location. In the disclosed technique, the initial location is modified to more closely align with the mold parting surface, although other optimization techniques are possible. As shown in in FIG. 4, at a particular tooth represented by 3D mesh 402, the computing device 150 can calculate the CG point of "contact bodies" 404. Referring back to FIG. 3, 304 represents an example contact body. That is, the used herein, "contact bodies" are defined as the volumes generated by intersecting the offset teeth. Used herein, "CG point" refers to the center of gravity of the contact bodies (here adjacent teeth). For instance, the CG point can be represented by the mathematical middle of the contact bodies and can be determined using conventional techniques.

The computing device 150 can also import a mold parting surface 406, which as described above refers to a 3D mesh that bisects two sides of one or more teeth (e.g., separates the facial side of one or more teeth from the lingual side of the one or more teeth). For instance, the mold parting surface 406 can be generated using anatomical landmarks from within the patient's dentition. In one embodiment, the geometry of the mold parting surface 406 may be created to pass through the midpoint of each of a series of slices, or other subdivisions, of the teeth. Other embodiments and formulations are possible.

For example, mold parting surface 406 may be generated in other implementations using one or more neural networks. A generative adversarial neural network (GAN) may be used. A GraphCNN (graph convolutional neural network) may also be used. Furthermore, a combination of these and other networks may be used.

The computing device 150 then maps the CG point 404 to the intersection line of the mold parting surface 406 and the contact plane, which is the best fit plane relative to the intersecting teeth. For instance, referring back to FIG. 3, computing device 150 can determine the location where the contact plane intersects the mold parting surface, which specifies the best fit plane 306. After the computing device has mapped the CG point 404, the computing device can generate a parametric oval at the new point 408. For instance, in some implementations, the CG point 404 can be translated within the XY plane to determine the location of new point 408. Computing device 150 can also determine the size of the parametric oval based on one or more parameters of the adjacent teeth. For example, the size of the parametric oval may be determined based on some combination of on average anatomical contact sizes of the adjacent teeth and which particular teeth are adjacent. As a result, for example, incisors, canines, and molars may all have differently shaped and differently sized contacts, according to particular implementations.

Figure 5:
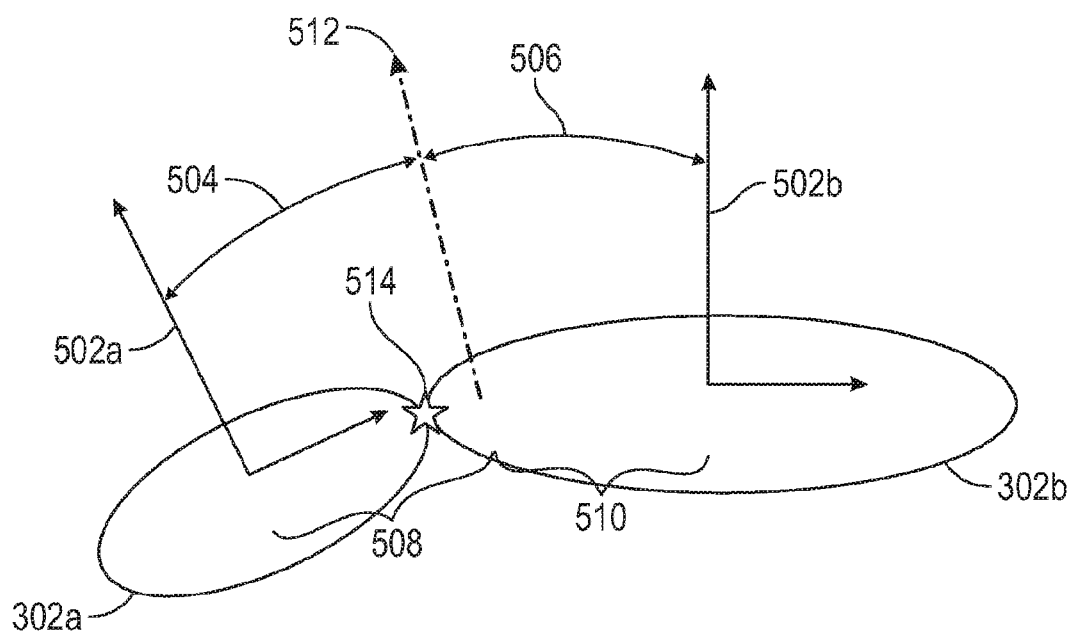
FIG. 5 is a conceptual diagram illustration how landmarking coordinate systems can be used to compute an orientation and location of the interproximal geometry, in according with various aspects of this disclosure.

FIG. 5 is a conceptual diagram illustration how landmarking coordinate systems can be used to compute an orientation and location of the interproximal geometry, in according with various aspects of this disclosure. In the illustrated example, the computing device 150 identifies or otherwise determines a first collection of landmarking coordinate systems 502a of a first 3D mesh representing tooth 302a. For example, the first landmarking coordinate system can be represented by the X, Y, and Z axes as defined relative to the 3D mesh representing the first tooth 302a. Likewise, the computing device 150 identifies or otherwise determines a second collection of landmarking coordinate systems 502b of a second 3D mesh representing tooth 302b. According to particular implementations, the landmarking coordinate systems 502a and 502b can be determined automatically by based on the morphology present in the digital 3D model. In other implementations, a user can manually adjust the landmarking coordinate systems 502b until the landmarking coordinates visually reflect the desired outcome of the adjustments based on the expertise of the user. Although it should be understood that landmarking coordinates 502a and 502b can be determined in other ways as well.

The computing device 150 can then average the first landmarking coordinate systems 502a and 502b to compute the average landmarking system 512. For instance, the computing device 150 can compute an average of the respective X, Y, and Z origins for the first landmarking coordinate system 502a and the second landmarking coordinate system 502b such that the distance 508 between the first landmarking coordinate system 502a and the average landmarking coordinate system 512 is the same or substantially similar to the distance 510 between the second landmarking coordinate system 502b and the average landmarking coordinate system 512.

The computing device 150 can also compute an orientation angle of the landmarking coordinate system. According to particular implementations, first and second landmarking coordinate system axes 502a and 502b are surface normals. That is, the landmarking coordinate system axes 502a and 502b form imaginary lines oriented at 90-degree angles relative to the surface of the to the teeth 302a and 302b, respectively. In other words, landmarking coordinate system axes 502a form an imaginary line perpendicular to the 3D mesh representing tooth 302a and landmarking coordinate system axes 502b form an imaginary line perpendicular to the 3d mesh representing tooth 302b. Using the surface normal allows the computing device 150 to compute the orientation angle of the average landmarking coordinate system axis 512. For instance, according to particular implementations, the orientation angle for the average landmarking coordinate system axis 512 can be determined by the computing device 150 such that an angle 504 between the first landmarking coordinate system axis 502a is the same as an angle 506 between the second landmarking coordinate system axis 502b. Stated differently, the computing device 150 can determine the orientation angle of the average landmarking coordinate system axis 512 by determining the angle 504 between a surface normal represented by landmarking coordinate system axis 502a and average landmarking coordinate system axis 512 that is the same as the angle 506 between a surface normal represented by second landmarking coordinate system axis 502b and the average landmarking coordinate system axis 512.

After the computing device 150 computes the orientation angle of the average landmarking coordinate system axis 512, the computing device 150 can translate the average landmarking coordinate system to point 514. In some implementations, point 514 represents a point where the 3D meshes that represent teeth 302a and 302b intersect. For instance, in one implementation, point 514 can be determined by generating a pair of points (one from each tooth mesh 302a and 302b) having a minimum distance between them and calculating the midpoint between them. In other implementations, point 514 may represent a point in the interproximal space between adjacent whereby the teeth are at a closest point without intersecting.

Figure 6A:
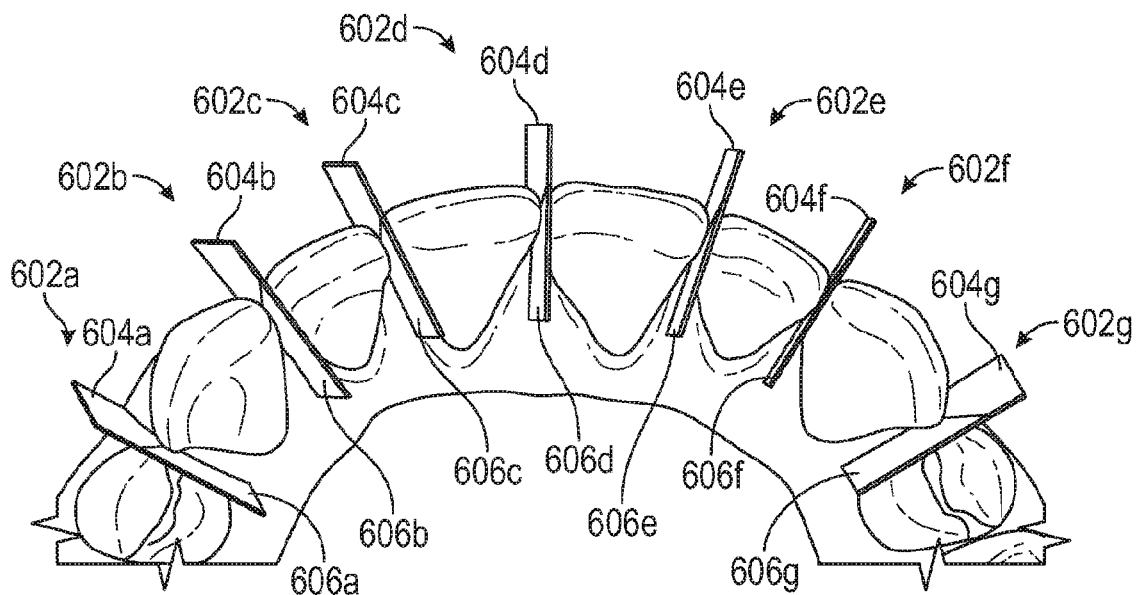
FIGS. 6A and 6B are conceptual diagrams illustrating placement of interproximal geometry with the option to offset features along the mesial-distal axis in accordance with various aspects of this disclosure.
Figure 6B:
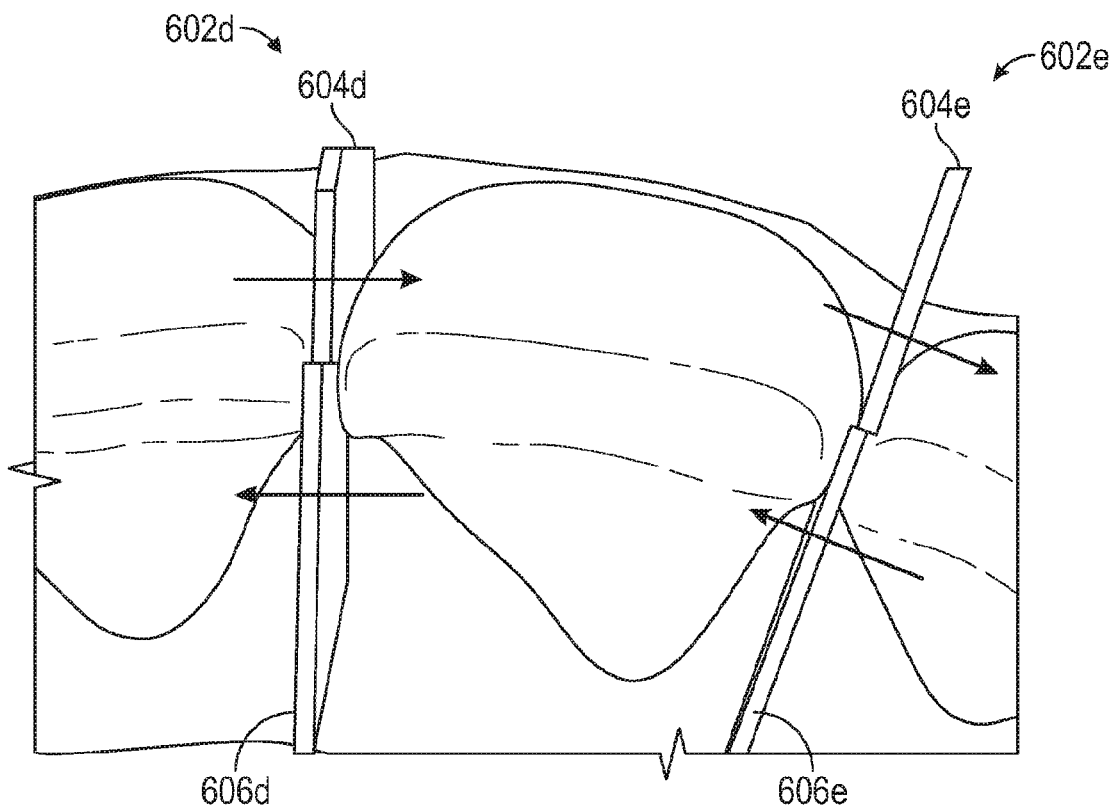

FIGS. 6A and 6B are conceptual diagrams illustrating an example technique for refining interproximal geometry, in accordance with various aspects of this disclosure. In general, the concepts shown in FIGS. 6A and 6B represent a refinement to the 3D model. For example, FIGS. 6A and 6B demonstrate a 3D model after one or more 3D geometries (e.g., 3D fins 602a-602g) have been inserted into respective interproximal spaces. As such, FIGS. 6A and 6B are described in the context of computing device 150, which may use refinement module 189 to perform the operations now described.

As shown in FIG. 6A and FIG. 6B, it may be advantageous to subdivide the interproximal 3D geometries 602a-602g into facial portions 604a-604g and lingual portions 606a-606g, for example, by bisecting the interproximal 3D geometries using the computed mold parting surface, such as mold parting surface 406. This allows the facial portions, represented by subdivisions 604d and 604e, and the lingual portions, represented by subdivisions 606d and 606e, of the interproximal 3D geometry to be moved independently to refine the positioning of the 3D interproximal geometry. For instance, as shown in FIG. 6B, facial subdivisions 604d and 604e and lingual subdivisions 606d and 606e can be displaced in response to input received by the refinement module 189 to reposition the respective subdivisions to improve the fit of the interproximal 3D geometry relative to the 3D meshes representing the adjacent teeth. In other words, the refinement module 189 can translate any of the subdivisions 604d, 604e, 606d, and 606e relative to the respective adjacent teeth to adjust the profile of the interproximal 3D geometry to refine the amount of contact, or level of tightness when flossing, between adjacent teeth.

Figure 7:
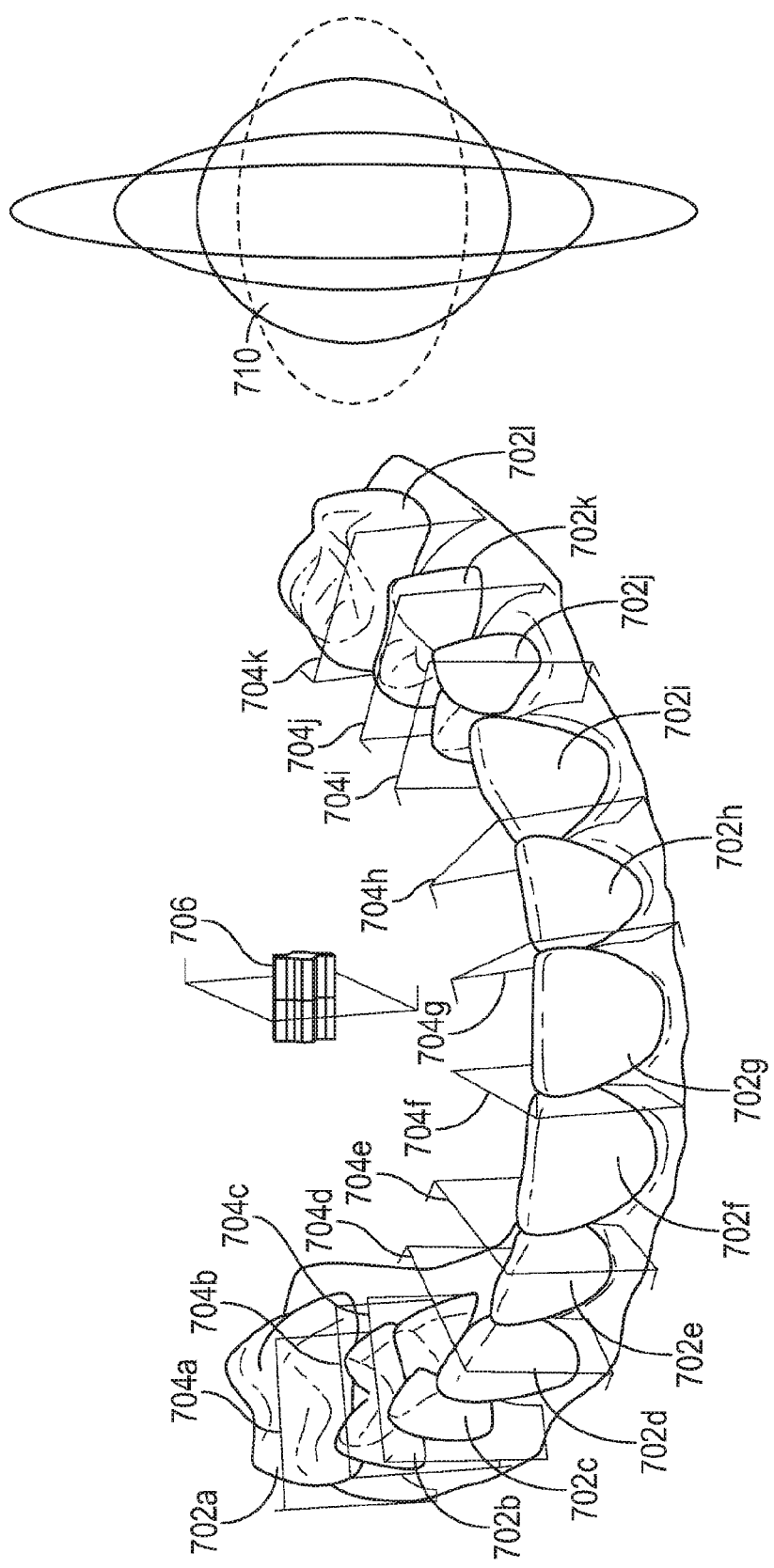
FIG. 7 is a conceptual diagram illustrating an example technique for placing ovoid cylinders within the 3D model, in accordance with various aspects of this disclosure.

FIGS. 7, 8A, 8B, 9A, and 9B are conceptual diagrams illustrating example techniques for refining the interproximal geometry using ovoid cylinders. According to particular implementations, the ovoid cylinders are first placed as shown in FIG. 7. Next, the orientation of the ovoid cylinders is modified as shown in FIGS. 8A, 8B, 9A, and 9B. As a result, FIGS. 7, 8A, 8B, 9A, and 9B are described in the context of computing device 150, which may use refinement module 189 to perform the operations now described.

FIG. 7 is a conceptual diagram illustrating an example technique for placing ovoid cylinders within the 3D model, in accordance with various aspects of this disclosure. The refinement module 189 can place contact planes 704a-704k between the 3D meshes representing teeth 702a-702l using the techniques described herein. For instance, in accordance with particular implementations, the refinement module 189 can determine the location of contact planes 704a-704k by computing a best fit plane 306 as described in connection with FIGS. 3A and 3B.

The refinement module 189 can then generate one or more ovoid cylinders, such as the example ovoid cylinders depicted as ovoid cylinders 710. For instance, according to particular implementations, the ovoid cylinders can be stock ovoid cylinders stored in appliance feature library 164. In other implementations, the ovoid cylinders can be scale version of the stock ovoid cylinders stored in appliance feature library 164. In other implementations, the ovoid cylinders can be generated. For instance, the ovoid cylinders can be generated by scaling a cylinder along the Z and/or Y axis to modify the cylinders into ovoid shapes. As another example, the ovoid cylinders can be generated based on parametric equations according to the dimensions of the interproximal spaces between adjacent teeth. In other examples, the ovoid cylinders may be based on shapes measured in studies of contact anatomy. In such situations, the cross section of the cylinder may technically differ from an ovoid where for example, anatomical contacts have been found to be kidney-shaped, etc. In other examples the rules for generating the anatomical contacts may be different between pairs of teeth. For instance, an ovoid in a tooth pair with an existing contact between untreated teeth may be treated differently from a diastema or a tooth pair where only occlusal lengthening is being performed in the treatment. Using one or more ovoid cylinders, such as one or more of the ovoid cylinders 710, contact windows, such as contact window 706, can be inserted into the 3D model. For instance, according to particular implementations, the refinement module 189 can define the one or more contact planes 704a-704k such that center of the contact planes 704a-704k bisects the respective ovoid cylinders, such as one of the ovoid cylinders shown as ovoid cylinders 710. Stated differently, refinement module 189 can use plane-to-plane alignment to place the ovoid cylinders in their respective interproximal contacts. For instance, the ovoid cylinders can be placed in the interproximal contact such that the midplane of the cylinder is fitted to the contact plane, such as contact planes 704a-704k. One example of using the plane-to-plane alignment is depicted relative to the position of orientation of contact window 706, although other positions and orientations are possible.

By placing an ovoid cylinder as described, the ovoid geometry defines a contact window, such as contact window 706, through a respective contact plane. For instance, each one of the ovoid cylinders can be subtracted from the respective interproximal fins (e.g., using a Boolean subtraction technique) to generate the contact windows. This allows the 3D model to include contact windows having configurable sizes and shapes. And the configurable contact windows may allow for the generation of a dental appliance that creates precise and tight interproximal contacts that have minimal bonding between teeth, providing for a filling procedure that is quicker and less reliant on saws, blades, and other tools to separate adjacent teeth after the restorative has been cured.

FIGS. 8A, 8B, 9A and 9B are conceptual diagrams illustrating example techniques for orienting ovoid cylinders, in accordance with various aspects of this disclosure. As shown in in FIGS. 8A and 8B, the refinement module 189 can orient the ovoid cylinders 802a-802g to account for varied tooth tip angles for teeth 804a-804j. For example, accordingly to particular implementations, the angle between the mold parting surface at each of the contact planes 704a-704k can be calculated by determining an intersection curve where the mold parting surface and the contact plane intersect. According to particular implementations, a line can be best fit to this intersection curve and an angle between the best fit line and the Z-axis (i.e., vertical axis) can be determined.

The resulting angles for each of the contact planes 704a-704k can then be used to rotate one or more ovoid geometries, such as one or more ovoid cylinders shown as ovoid cylinders 710, so that the resulting contact windows match the orientation of the respective teeth. For example, an ovoid cylinder placed relative to contact plane 704g can be rotated by an amount equal to the calculated angle between the mold parting surface and the Z-axis (i.e., the vertical axis) as measured at the contact plane 704g. The ovoid cylinder is then subtracted (e.g., using a Boolean subtraction technique) from the interproximal fin inserted between the teeth 702g and 702h to generate a contact window with an angle of orientation that reflects the tooth inclination of teeth 702g and 702h.

Figure 8A:
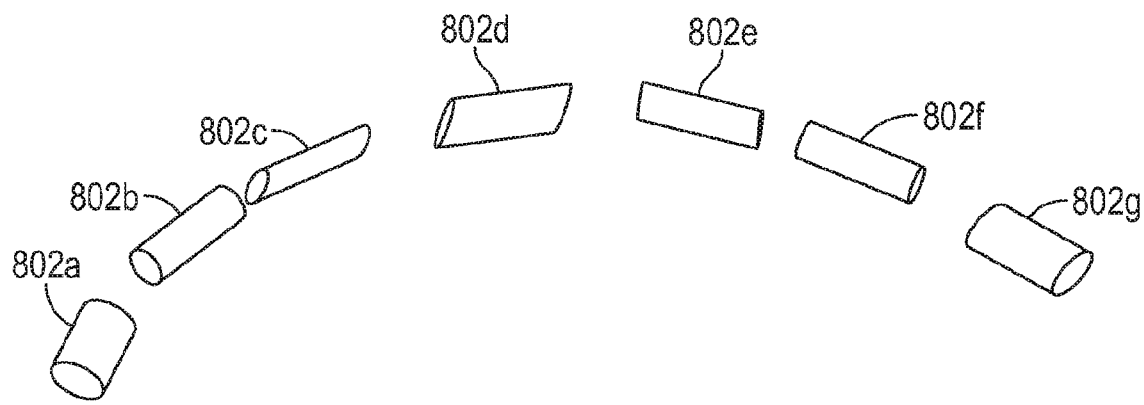
FIGS. 8A, 8B, 9A and 9B are conceptual diagrams illustrating example techniques for orienting ovoid cylinders, in accordance with various aspects of this disclosure.
Figure 8B:
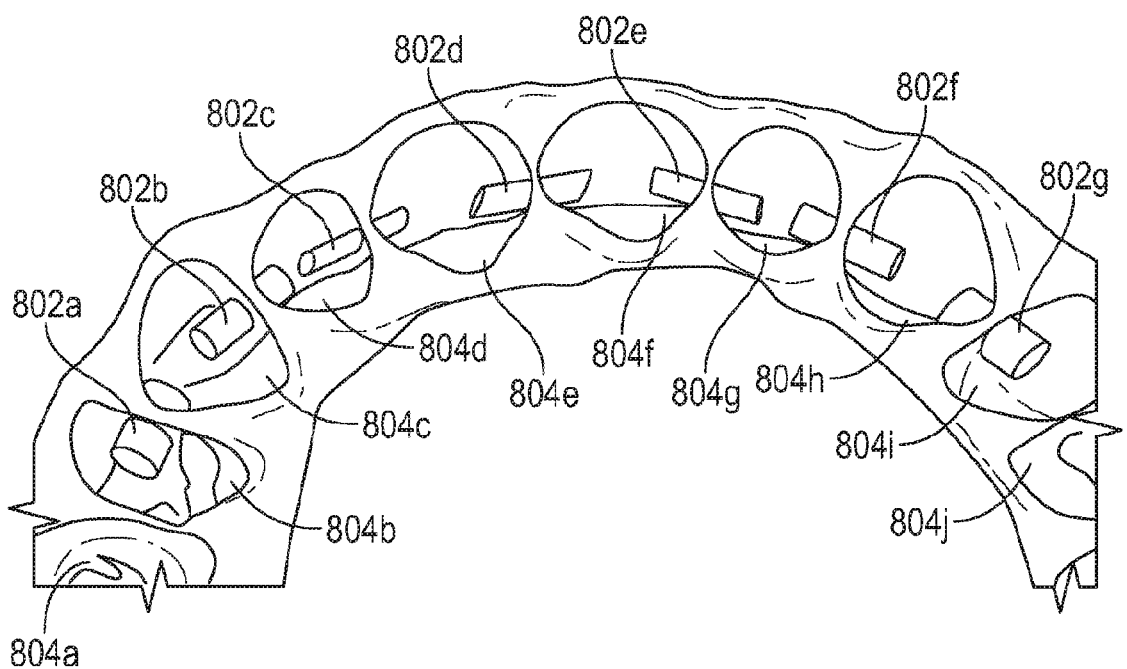

Once the orientations of the cylinders 802a-802g have been modified, the refinement module 189 can place the re-oriented cylinders 802a-802g at their respective locations relative to the contact planes 704a-704k. As shown in FIG. 8B, it should be appreciated that after rotation, the contact windows defined by the ovoid cylinders 802a-802g present a natural, aligned, and parameterized contact definition for the 3D meshes representing teeth 804a-804j.

Figure 9A:
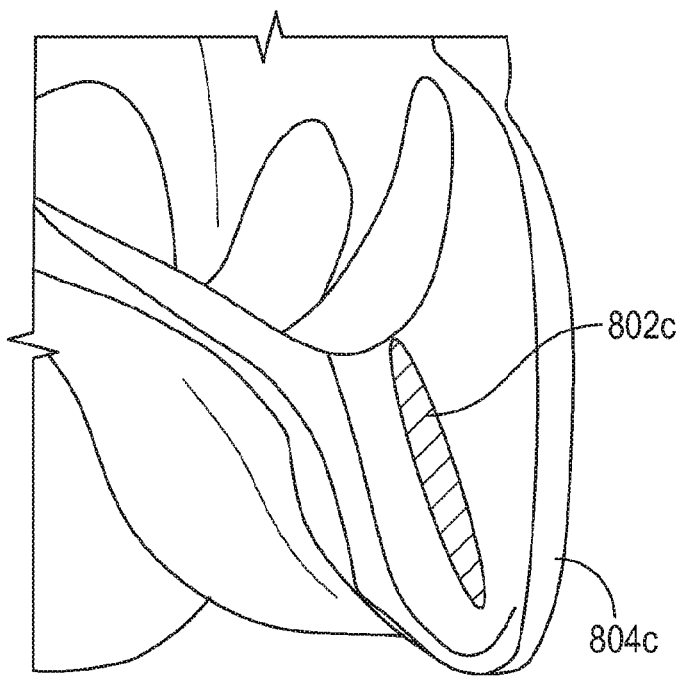
Figure 9B:
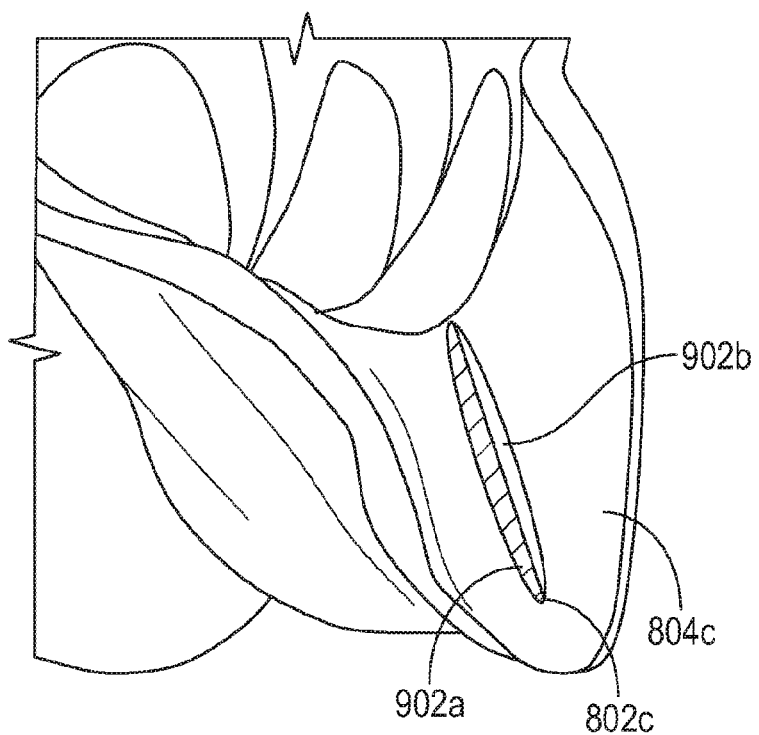

FIGS. 9A and 9B show a different conceptual view of the ovoid cylinder 802c relative to the 3D mesh representing tooth 804c. As shown and described, ovoid cylinder 802c's angle of orientation now matches the inclination of the 3D mesh representing tooth 804c. According to particular implementations, and as described above, each one of the ovoid cylinders can be subtracted from the respective interproximal fins to generate the contact windows. It may also be advantageous to further refine one or more ovoid cylinders prior to generating a respective contact window. For instance, according to some implementations and as depicted by FIG. 9B, prior to subtraction, the ovoid cylinder 802c can be subdivided into lingual and facial components 902a and 902b, respectively. For instance, the refinement module 189 can subdivide ovoid cylinder 802c using the mold parting surface (such as a mold parting surface like mold parting surface 406) of tooth 804c. In one implementation, the refinement module 189 can position the parting surface in such a way that it bisects the ovoid cylinder 802c to generate lingual component 902a and facial component 902b. This allows for even greater design control of the contact windows. For instance, the refinement module 189 can modify the position and orientation of lingual component 902a or facial component 902b instead of only modifying the position and orientation of the entire ovoid cylinder 802c.

Figure 10A:
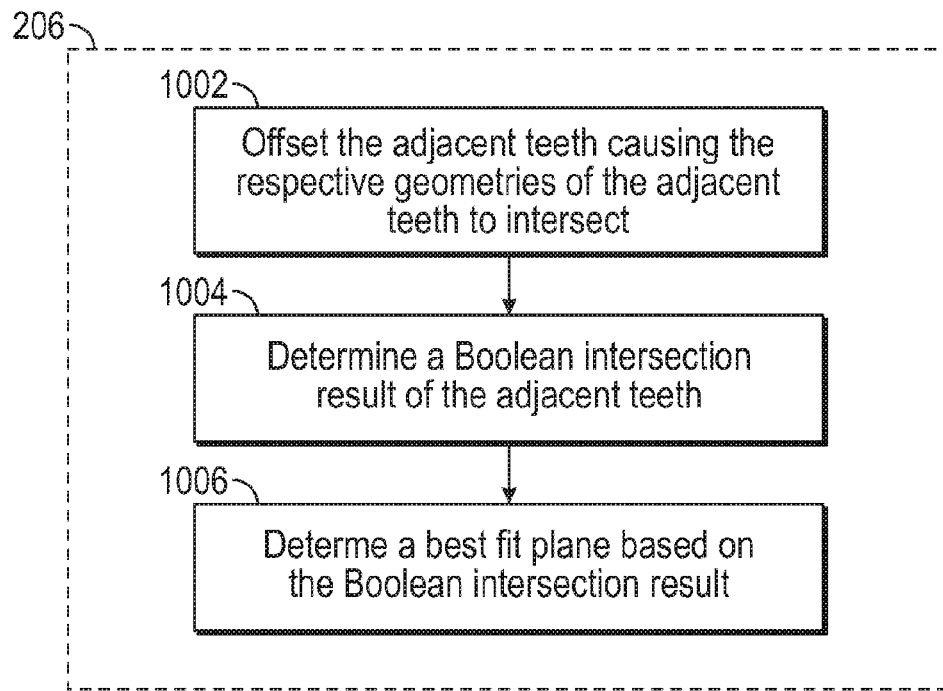
FIGS. 10A-10B are flow diagrams illustrating example techniques for determining a location and an orientation of the interproximal geometry, in accordance with various aspects of this disclosure.
Figure 10B:
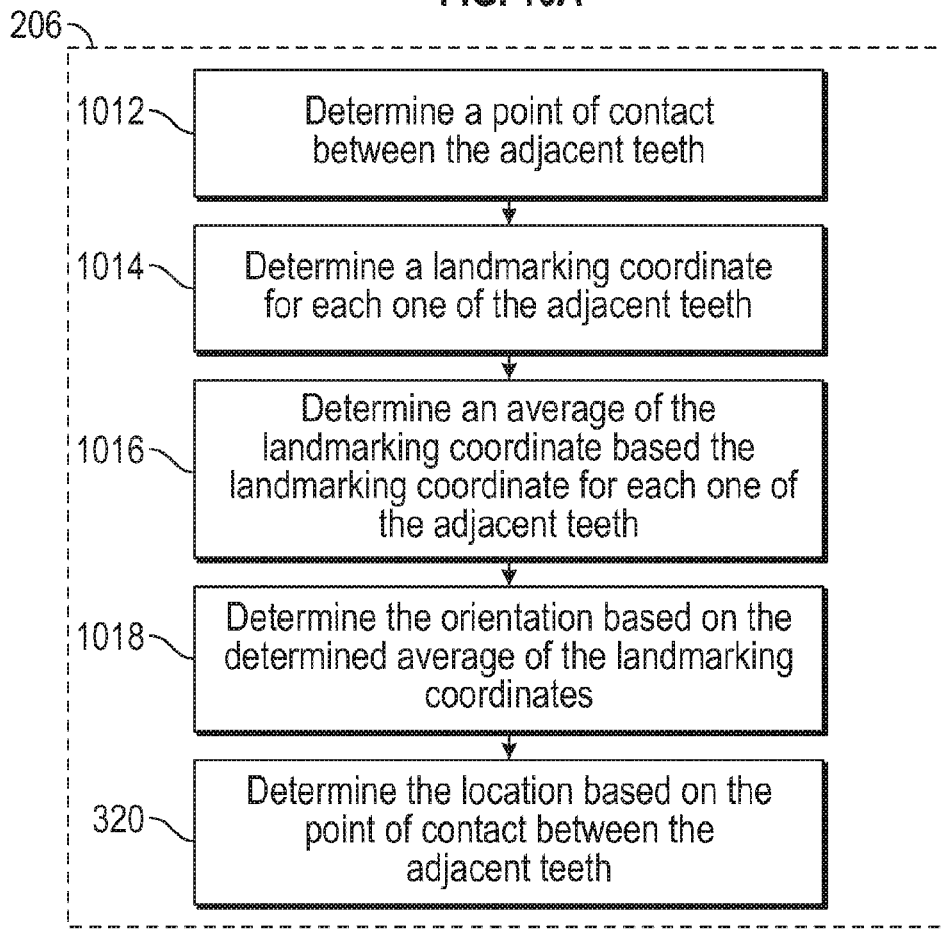

FIGS. 10A and 10B are flow diagrams illustrating example techniques for determining a location and an orientation of the interproximal geometry at step 206 of technique 200. For clarity, the example techniques in FIGS. 10A and 10B are described independently but it should be understood and appreciated that the techniques disclosed can be used in combination.

Turning to FIG. 10A, at step 1002, the computing device 150 offsets, or translates, the 3D meshes representing the adjacent teeth causing the 3D meshes to intersect. For instance, as illustrated and described in connection with FIGS. 3A and 3B, the computing device 150 can translate 3D meshes representing teeth 302a and 302b. In one implementation, the 3D meshes are offset so that they intersect by no more 50 microns. At step 1004, the computing device 150 determines a Boolean intersection result of the overlapping meshes. For instance, computing device 150 can determine intersection 304 shown and described in connection with FIGS. 3A and 3B. Step 1004 is generally performed using conventional techniques. For example, using a Boolean intersection technique, the computing device 150 identifies and keeps the portion of the 3D meshes that are overlapping and discards the portion of the 3D meshes that do not overlap.

At step 1006, the computing device 150 determines a best fit plane based on the Boolean intersection result. For instance, computing device 150 can use conventional techniques to compute the best fit plane 306 shown and described in connection with FIGS. 3A and 3B based on the Boolean intersection result.

Turning now to FIG. 10B, a technique for determining location and orientation are described using landmarking coordinate systems of adjacent teeth. At step 1012, computing device 150 determines a point of contact between the adjacent teeth. For example, as shown and described in FIG. 5, the computing device 150 can determine point 514 by determining an intersection point of the 3D meshes representing teeth 304a and 304b.

At step 1014, the computing device 150 determines a landmarking coordinate system for each one of the adjacent teeth. For example, as shown and described in FIG. 5, the computing device 150 can determine landmarking coordinate systems based on the morphology present in the digital 3D model, based on received user input, and using other techniques to determine landmarking coordinate systems.

At step 1016, the computing device 150 determines an average of the landmarking coordinate systems for each one of the adjacent teeth. For example, as shown and described in reference to FIG. 5, the computing device 150 can compute an average of the respective X, Y, and Z coordinate system axes for the first landmarking coordinate system 502a and the second landmarking coordinate system 502b such that the distance 508 between the first landmarking coordinate system 502a and the average landmarking coordinate system 512 is the same or substantially similar to the distance 510 between the second landmarking coordinate system 502b and the average landmarking coordinate system 512.

At step 1018, the computing device 150 determines the orientation based on the determined average of the landmarking coordinate systems. For example, as shown and described in FIG. 5, the orientation angle for the average landmarking coordinate system 512 can be determined by the computing device 150 such that an angle 504 between the first landmarking coordinate system axis 502a is the same as an angle 506 between the second landmarking coordinate system axis 502b.

At step 1020, the computing device 150 determines the location based on the point of contact between the adjacent teeth. For example, as described in reference to FIG. 5, the computing device 150 can translate the average landmarking coordinate system to point 514. In other words, according to particular implementations, the computed average landmarking coordinate systems 512 are modified by the values of point 514 to determine the location.

FIGS. 11A-11D are flow diagrams illustrating example techniques for refining the digital 3D geometry at step 210 of technique 200, in accordance with various aspects of this disclosure. In particular implementations, this involves customizing the interproximal geometry, in accordance with various aspects of this disclosure. For clarity, the example techniques in FIGS. 11A-11D are described independently but it should be understood and appreciated that one or more techniques illustrated in FIGS. 11A-11D can be used in combination to refine the digital 3D model, e.g., the digital 3D model representing dental appliance 101.

Figure 11A:
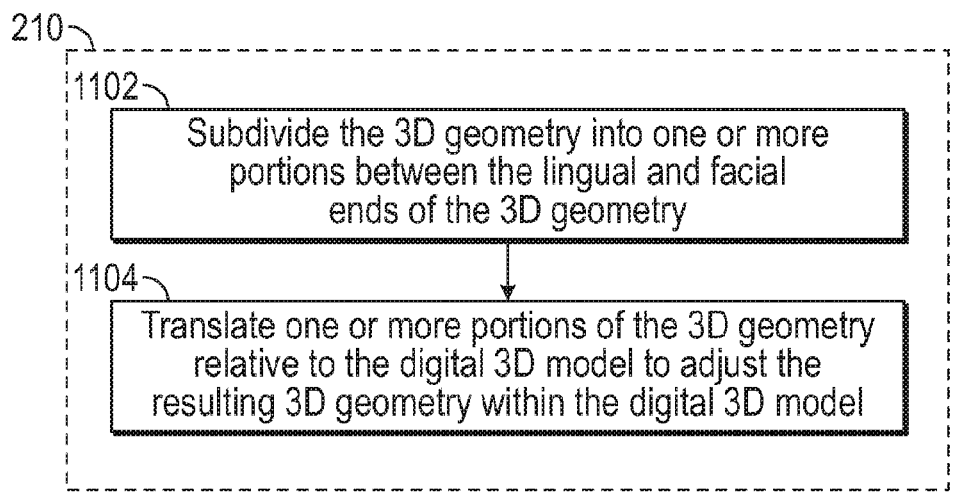
FIGS. 11A-11D are flow diagrams illustrating example techniques for refining the digital 3D geometry to customize the interproximal geometry, in accordance with various aspects of this disclosure.

Turning to FIG. 11A, at step 1102, the refinement module 189 subdivides the 3D geometry into one or more portions between the lingual and facial ends of the 3D geometry. For instance, as shown and described in FIGS. 6A and 6B, refinement module 189 can subdivide 3D fins 602a-602g into lingual ends 606a-606g and facial ends 604a-604g using a mold parting surface.

In step 1104, the refinement module 189 translates one or more portions of the 3D geometry relative to the digital 3D model to adjust the resulting 3D geometry within the digital 3D model. For instance, as shown and described in FIG. 6B, the refinement module 189 can translate facial portions 604d and/or 604e and lingual portions 606d and/or 606e to adjust the fit of the 3D fins 602d and/or 602e, respectively.

Figure 11B:
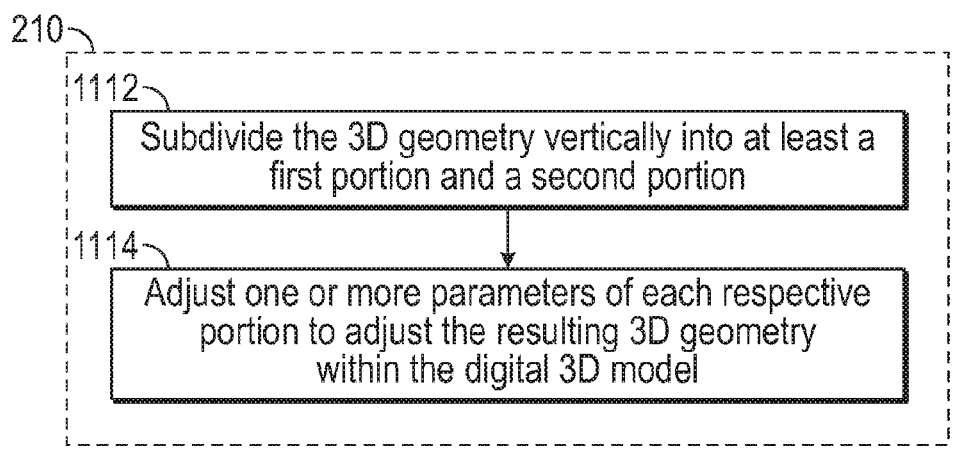

Turning to FIG. 11B, at step 1112, the refinement module 189 subdivides the 3D geometry vertically into at least a first portion and a section portion. For instance, as shown and described in reference to FIG. 3B, the refinement module 189 can subdivide a 3D fin into multiple zones 308a-308c.

In step 1114, the refinement module 189 adjust one or more parameters of each respective portion to adjust the resulting 3D geometry within the digital 3D model. The parameters can include the relative position of each of the respective portions, the thickness of the respective portions, and other parameters. For instance, as shown and described in reference to FIG. 3B, refinement module 189 can modify the thickness of zone 308a to have a different thickness than zones 308b and 308c. Likewise, refinement module 189 can modify the thickness of zones 308b and/or 308c.

Figure 11C:
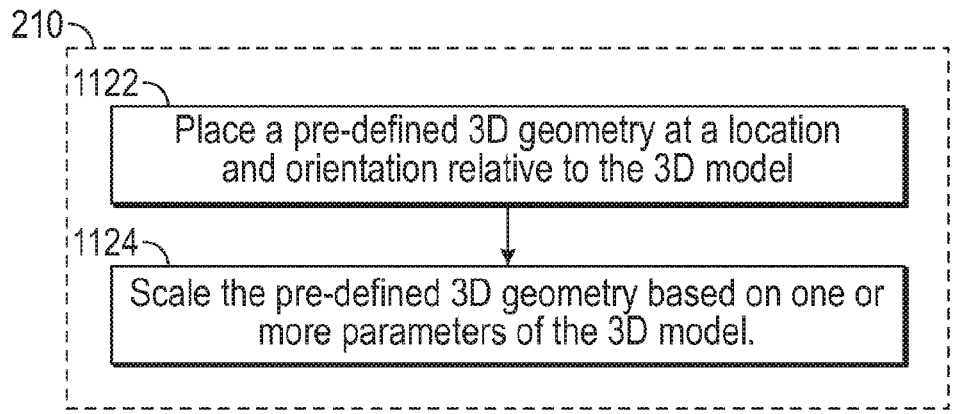

In FIG. 11C, at step 1122, the refinement module 189 places a pre-defined 3D geometry at a location and orientation relative to the digital 3D model. For instance, as shown and described in reference to FIG. 3A, the refinement module 189 can place a pre-define plane 306 at the intersection of 3D meshes representing adjacent teeth 302a and 302b. As another example, as shown and described in reference to FIGS. 5 and 6A, the refinement module 189 can insert a 3D fin at point 514 having an orientation equal to landmarking axis 512.

In step 1124, the refinement module 189 scales the pre-defined 3D geometry based on one or more parameters of the 3D model. For instance, as shown and described in reference to FIG. 3A, the refinement module 189 can increase the thickness of the best fit plane 306 to generate 3D fin 308. As another example, the refinement module 189 can scale any of 3D fins 602a-602g to promote an improved interproximal fit between the 3D meshes representing adjacent teeth.

Figure 11D:
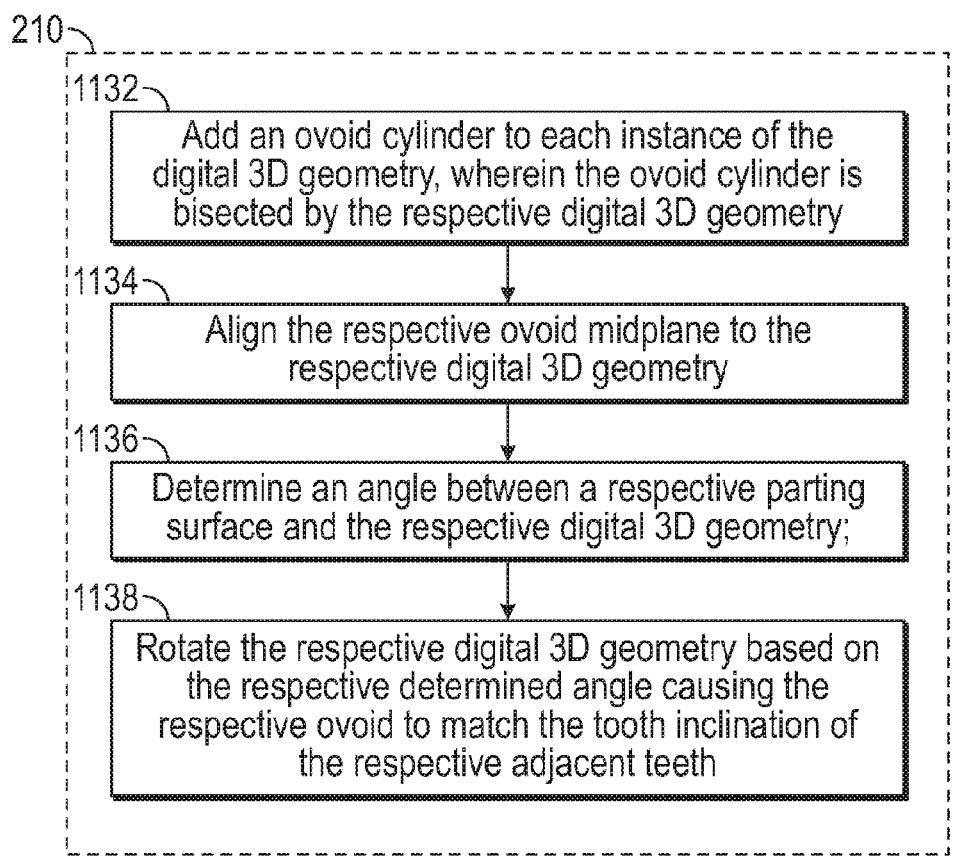

Turning to FIG. 11D, at step 1132, the refinement module 189 adds an ovoid cylinder to each instance of the digital 3D geometry. For example, as shown and described in relation to FIG. 7, the refinement module 189 can insert one or more ovoid cylinders into contact planes 704a-704k in the interproximal spaces of 3D meshes representing teeth 702a-702l. Furthermore, according to particular implementations, the inserted 3D geometry is bisected by the respective digital 3D geometry. For instance, as shown and described in reference to FIG. 7, the refinement module 189 module positions the ovoid cylinder (e.g., ovoid cylinder 710) such that it bisects a contact plane generating a contact window 706.

In step 1134, the refinement module 189 aligns the respective ovoid midplane to the respective digital 3D geometry. For example, as shown and described in relation to FIGS. 8A and 8B, the respective ovoid midplane can be aligned to any inclination that is present in the respective teeth of the 3D model.

In step 1136, the refinement module 189 determines an angle between a respective parting surface and the respective digital 3D geometry. For example, as shown and described in relation to FIGS. 8A-9B, the angle between the mold parting surface at each of the contact planes 704a-704k can be calculated. In other words, determining an angle between a respective parting surface may include determining an angle between a tooth's occlusal-gingival axis and the respective 3D digital geometry. The resulting values can then be used to rotate one or more ovoid geometries, such one or more ovoid cylinders represented by ovoid cylinders 710, so that the resulting contact windows match the orientation of the teeth.

In step 1138, the refinement module 189 rotates the respective digital 3D geometry based on the respective determined angle causing the respective ovoid to match the tooth inclination of the respective adjacent teeth. For example, as shown and described in FIG. 9A, the ovoid cylinder 802c's orientation matches the orientation of the 3D mesh representing tooth 804c. In some implementations, the refinement module 189 can subdivide the respective digital 3D geometry to further refine the placement and orientation of the geometry. For instance, as shown and described in FIG. 9B, a mold parting surface can be applied to the ovoid cylinder 802c to bisect the cylinder 802c into a lingual portion 1002a and a facial portion 1002b.

What is claimed is:

1. A computer-implemented method for digitally designing interproximal geometry, the method comprising:
generating a digital three-dimensional (3D) model of a future dental anatomy of a patient, the future dental anatomy representing an intended shape of at least one tooth of the patient;
selecting one or more pairs of teeth in the 3D model, wherein the teeth in the pair are adjacent;
for each selected pair of teeth, determining a location and orientation in the interproximal space of the adjacent teeth to insert a digital 3D geometry having one or more initial parameters; and
inserting the digital 3D geometry at the determined location and orientation.

2. The computer-implemented method of claim 1, wherein the one or more initial parameters of the digital 3D geometry comprises at least one thickness that is greater than 100 and less than 500 microns.

3. The computer-implemented method of claim 1, wherein determining the location and orientation in the interproximal space comprises:
offsetting the adjacent teeth causing the respective geometries of the adjacent teeth to intersect;
determining a Boolean intersection result of the adjacent teeth; and
determining a best fit plane based on the Boolean intersection result.

4. The computer-implemented method of claim 1, wherein determining the location and orientation in the interproximal space comprises:
determining a point of contact between the adjacent teeth;
determining a landmarking coordinate system for each one of the adjacent teeth;
determining an average of the landmarking coordinate system based the landmarking coordinate for each one of the adjacent teeth;
determining the orientation based on the determined average of the landmarking coordinate systems; and
determining the location based on the point of contact between the adjacent teeth.

5. The computer-implemented method of claim 1, further comprising:
refining the digital 3D geometry.

6. The computer-implemented method of claim 5, wherein the refining comprises:
subdividing the 3D geometry into one or more portions between the lingual and facial ends of the 3D geometry; and
translating one or more portions of the 3D geometry relative to the digital 3D model to adjust the resulting 3D geometry within the digital 3D model.

7. The computer-implemented method of claim 5, wherein the refining comprises:
subdividing the 3D geometry vertically into at least a first portion and a second portion; and
adjusting one or more parameters of each respective portion to adjust the resulting 3D geometry within the digital 3D model.

8. The computer-implemented method of claim 7, wherein the parameters comprise at least one of a first thickness along the mesial-distal axis, a distance along the gingival-occlusal axis, and an offset of each respective portion.

9. The computer-implemented method of claim 8, wherein the parameters of each respective portion are different for each of the respective portions.

10. The computer-implemented method of claim 5, wherein the refining comprises:
placing a pre-defined 3D geometry at a location and orientation relative to the 3D model; and
scaling the pre-defined 3D geometry based on or more parameters of the 3D model.

11. The method of claim 10, further comprising:
generating a file that represents a 3D dimensional physical matrix that includes the 3D model and the refined 3D geometry; and
generating the physical matrix from the representation.

12. The computer-implemented method of claim 11, wherein generating the physical matrix from the representation comprises using a 3D printer to construct the physical matrix from the representation.

13. The computer-implemented method of claim 5, wherein the refining comprises:
adding an ovoid cylinder to each instance of the digital 3D geometry, wherein the ovoid cylinder is bisected by the respective digital 3D geometry;
for each added ovoid, aligning the respective ovoid midplane to the respective digital 3D geometry;
for each digital 3D geometry, determining an angle between a respective parting surface and the respective digital 3D geometry; and
for each digital 3D geometry, rotating the respective digital 3D geometry based on the respective determined angle causing the respective ovoid to match the tooth inclination of the respective adjacent teeth.

14. A computer-implemented method for digitally designing interproximal geometry, the method comprising:
generating a digital three-dimensional (3D) model of a future dental anatomy of a patient, the future dental anatomy representing an intended shape of at least one tooth of the patient;
selecting one or more pairs of teeth in the 3D model, wherein the teeth in the pair are adjacent;
for each selected pair of teeth, determining a location and orientation in the interproximal space of the adjacent teeth to insert a digital 3D geometry having one or more initial parameters;
inserting the digital 3D geometry at the determined location and orientation;
refining the digital 3D geometry;
generating a file that represents a 3D dimensional physical matrix that includes the 3D model and the refined 3D geometry; and
generating the physical matrix from the representation.

* * * * *